US012649142B2

(12) United States Patent
Cevik et al.

(10) Patent No.: US 12,649,142 B2
(45) Date of Patent: Jun. 9, 2026

(54) MOLYBDENUM CERAMIC-BASED NANOCOMPOSITE SORBENT FOR REMOVAL OF ORGANIC POLLUTANTS FROM WATER

(71) Applicant: Imam Abdulrahman Bin Faisal University, Dammam (SA)

(72) Inventors: Emre Cevik, Dammam (SA); Omer Aga, Dammam (SA); Ayhan Bozkurt, Dammam (SA)

(73) Assignee: Imam Abdulrahman Bin Faisal University, Dammam (SA)

(*) Notice: Subject to any disclaimer, the term of this patent is extended or adjusted under 35 U.S.C. 154(b) by 857 days.

(21) Appl. No.: 17/871,368

(22) Filed: Jul. 22, 2022

(65) Prior Publication Data

US 2024/0024843 A1      Jan. 25, 2024

(51) Int. Cl.
*B01J 20/02*        (2006.01)
*B01D 69/02*        (2006.01)
(Continued)

(52) U.S. Cl.
CPC .......... *B01J 20/0218* (2013.01); *B01D 69/02* (2013.01); *B01D 69/147* (2013.01); *B01D 71/34* (2013.01); *B01J 20/28033* (2013.01); *B01J 20/3078* (2013.01); *C02F 1/288* (2013.01); *C02F 1/44* (2013.01); *B01D 2325/02* (2013.01); *B01D 2325/04* (2013.01); *C02F 1/281* (2013.01); *C02F 2101/308* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 11,111,166 B1 | 9/2021 | Salah et al. | |
| 2015/0053610 A1* | 2/2015 | Diallo ............... | B01D 69/1071 |
| | | | 210/500.39 |
| 2023/0191340 A1* | 6/2023 | Baroud .................. | B01D 69/02 |
| | | | 210/640 |

FOREIGN PATENT DOCUMENTS

| | | |
|---|---|---|
| CN | 106186158 A | 12/2016 |
| CN | 106315741 A | 1/2017 |

(Continued)

OTHER PUBLICATIONS

Lakshmanan Gurusamy, et al., Defective engineering of heterostructured N-Mo2C@MoO3-x electrode materials for the dual function of electrochemical sensing and supercapacitor applications, Electrochimica Acta, vol. 408, 2022, 139964.*

(Continued)

*Primary Examiner* — Benjamin L Lebron
*Assistant Examiner* — Eric J Mccullough
(74) *Attorney, Agent, or Firm* — Oblon, McClelland, Maier & Neustadt, L.L.P.

(57)        ABSTRACT

A nanocomposite sorbent which contains molybdenum carbide, molybdenum nitride, and molybdenum oxide. The nanocomposite sorbent is in the form of nanosheets having a mean size of 10 to 100 μm and a mean thickness of 10 to 1000 nm. A method of forming the nanocomposite sorbent is also provided. The nanocomposite sorbent is used to form a membrane filter with a fluorinated polymer. The nanocomposite sorbent and membrane filter are each used in a method of removing an organic pollutant from water.

15 Claims, 13 Drawing Sheets

(51) Int. Cl.

| | | |
|---|---|---|
| *B01D 69/14* | (2006.01) |
| *B01D 71/34* | (2006.01) |
| *B01J 20/28* | (2006.01) |
| *B01J 20/30* | (2006.01) |
| *C02F 1/28* | (2023.01) |
| *C02F 1/44* | (2023.01) |
| *C02F 101/30* | (2006.01) |

(56) References Cited

FOREIGN PATENT DOCUMENTS

| CN | 109133195 A | 1/2019 |
|----|-------------|--------|
| CN | 113481517 A | 10/2021 |

OTHER PUBLICATIONS

Nallappan Maheswari, Gopalan Muralidharan, Controlled synthesis of nanostructured molybdenum oxide electrodes for high performance supercapacitor devices, Applied Surface Science, vol. 416, 2017, pp. 461-469.*

Xinglin Lu, et al., Relating Selectivity and Separation Performance of Lamellar Two-Dimensional Molybdenum Disulfide (MoS2) Membranes to Nanosheet Stacking Behavior, Environmental Science & Technology 2020 54 (15), 9640-9651.*

Yao, et al., Nitrogen-doped carbon encapsulating molybdenum carbide and nickel nanostructures loaded with PVDF membrane for hexavalent chromium reduction, Chemical Engineering Journal, vol. 344, 2018, pp. 535-544.*

Siqin Jia, Qiguan Wang, Jian Chen, Sumin Wang, High-active nanoplates of nitrogen-doped carbon@Mo2C as efficient catalysts in water splitting, Synthetic Metals, vol. 279, 2021, 116847, ISSN 0379-6779; (Year: 2021).*

Chaoyun Tang, et al., Coupled molybdenum carbide and nitride on carbon nanosheets: An efficient and durable hydrogen evolution electrocatalyst in both acid and alkaline media, Electrochimica Acta, vol. 280, 2018, pp. 323-331, ISSN 0013-4686 (Year: 2018).*

Rui Jiang, et al., Electrochemically synthesized N-doped molybdenum carbide nanoparticles for efficient catalysis of hydrogen evolution reaction, Electrochimica Acta, vol. 261, 2018, pp. 578-587, ISSN 0013-4686 (Year: 2018).*

Fan, et al. ; Preparation of fluorinated covalent organic polymers at room temperature for removal and detection of perfluorinated compounds ; Journal of Hazardous Materials, vol. 420 ; Oct. 15, 2021 ; 24.

Mahmoud, et al. ; Developed magnetic Fe3O4—MoO3—AC nanocomposite for effective removal of ciprofloxacin from water ; Materials Chemisry and Physics, vol. 257 ; Jan. 1, 2021 ; 42 Pages.

Lin, et al. ; Constituting fully integrated colorimetric analysis system for Fe(III) on multifunctional itogen-doped MoO3/cellulose papers ; Talanta, vol. 180 ; Apr. 1, 2018 ; 20 Pages.

* cited by examiner

FIG. 3G.                                        FIG. 3H.
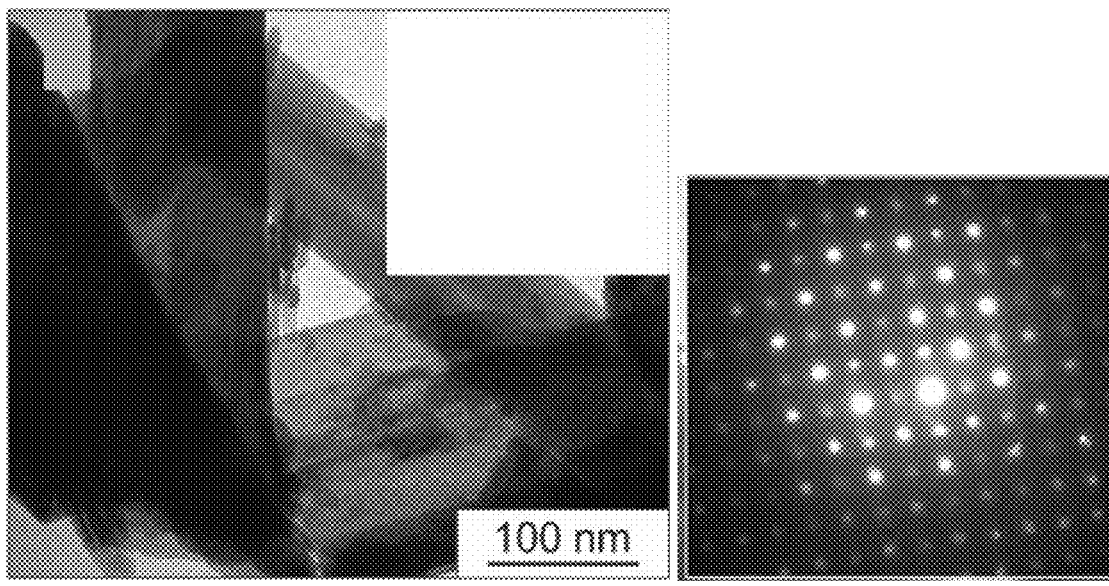
FIG. 4A.
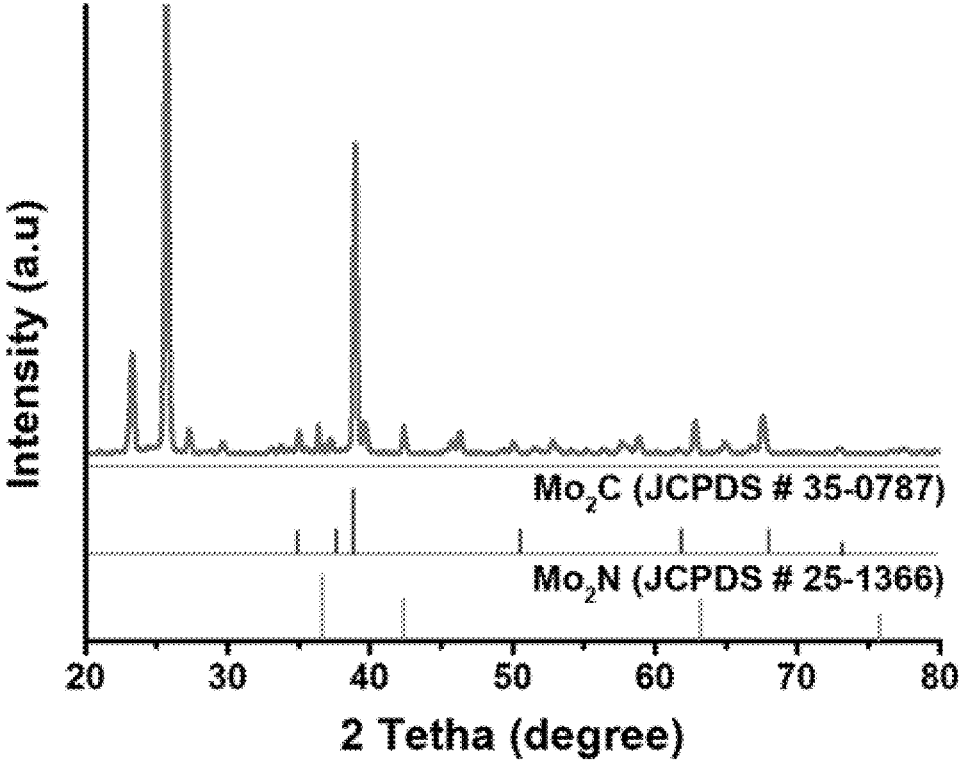

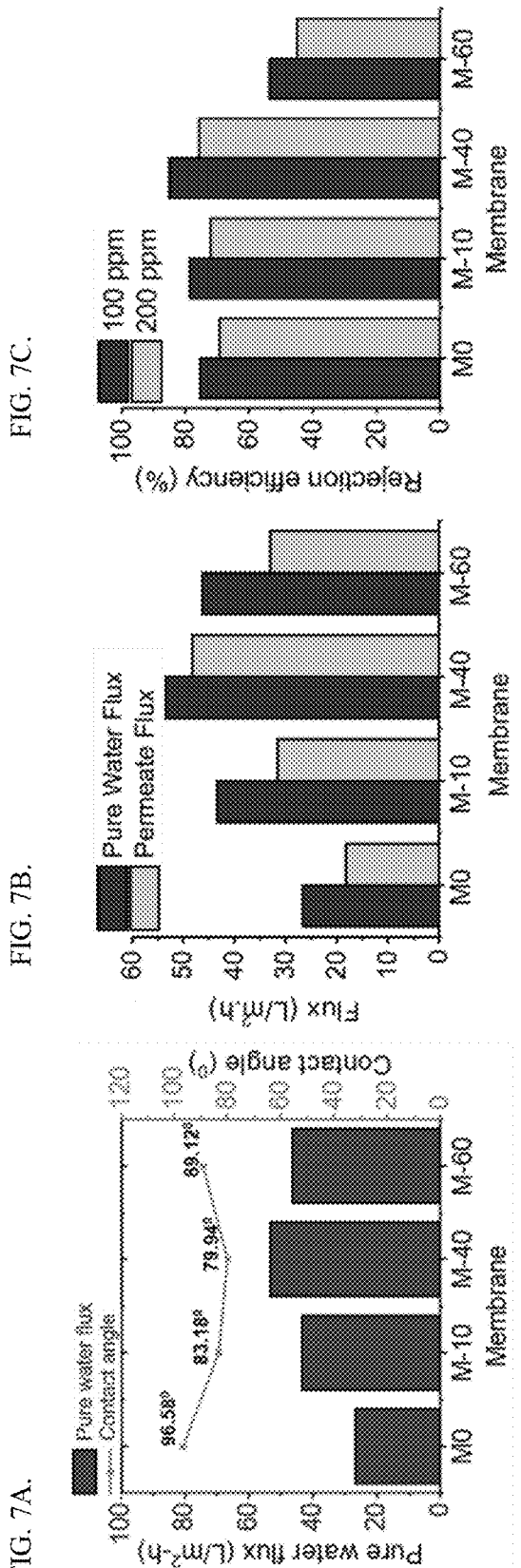
FIG. 7A.
FIG. 7B.
FIG. 7C.
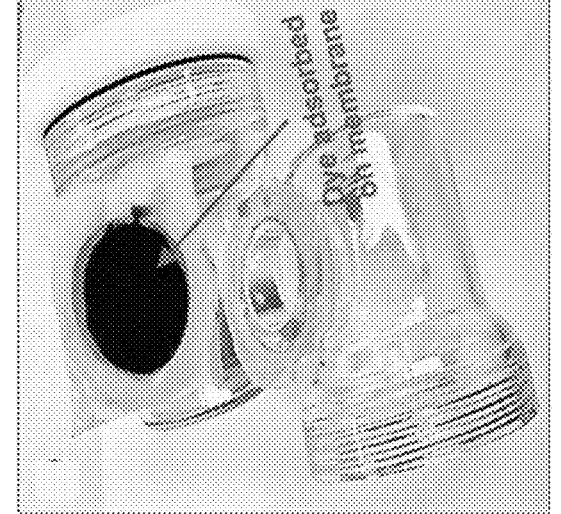
FIG. 7D.

1

MOLYBDENUM CERAMIC-BASED NANOCOMPOSITE SORBENT FOR REMOVAL OF ORGANIC POLLUTANTS FROM WATER

STATEMENT OF PRIOR DISCLOSURE BY THE INVENTORS

Aspects of the present disclosure are described in the article "Highly robust multilayer nanosheets with ultra-efficient batch adsorption and gravity-driven filtration capability for dye removal" published in the Journal of Industrial and Engineering Chemistry 2022, Vol 109, 287-295, available on Feb. 12, 2022, which is incorporated herein by reference in its entirety.

BACKGROUND OF THE INVENTION

Field of the Invention

The present disclosure relates to a nanocomposite sorbent which contains molybdenum oxide, molybdenum carbide, and molybdenum nitride and is in the form of nanosheets, a method of forming the nanocomposite sorbent, a membrane filter which contains the nanocomposite sorbent, and a method of removing an organic pollutant from water using the nanocomposite sorbent.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Global industrialization has grown rapidly, causing increased water pollution. Particularly, the wastewater created as a byproduct of industrial textile production is of great concern because it contains a variety of toxic organic dyes that can lead to severe human health impacts such as leukemia, brain disorders, various life-threatening allergies, and cancer. Removing or degrading such dyes is very difficult using conventional treatment methods due to factors which make them attractive for use as dyes such as low biodegradability and high dissolubility. Although a wide range of water treatment applications are available for the removal of organic dyes such as coagulation, ozonation, ion exchange, electrochemical processes, and photocatalytic degradation, each of these techniques have certain drawbacks such as either high cost or different detrimental environmental or health effects. For example, coagulation may result in the production of large quantities of sludge volumes, whereas ozonation and photocatalytic degradation of dyes cause the generation of toxic byproducts. Although the ion exchange process is a very effective treatment method, it is limited to only a few dyes. Among numerous water treatment technologies, adsorption has been proved as a very effective treatment for dye removal due to its exceptional advantages such as efficient removal of dye from water, facile operation, and environmental friendliness. Conventional materials like zeolites, minerals, activated carbon, clays, cellulose, and ion exchange resins all face certain limitations in terms of high cost, complicated operation, and selective sorption capacity.

Accordingly it is an objective of the present disclosure to provide a nanocomposite sorbent which overcomes the limitations of conventional sorbents.

Summary of the Invention

The present disclosure relates to a nanocomposite sorbent, comprising molybdenum carbide, molybdenum nitride, and molybdenum oxide, wherein the nanocomposite sorbent is in the form of nanosheets having a mean size of 10 to 100 μm and a mean thickness of 10 to 1000 nm.

In some embodiments, the nanosheets exist as stacks having a mean distance between nanosheets of 2 to 20 nm.

In some embodiments, the molybdenum carbide, molybdenum nitride, and molybdenum oxide are crystalline by PXRD.

In some embodiments, the molybdenum oxide is monoclinic $MoO_3$ and is present in an amount of greater than 50 wt % based on a total weight of nanocomposite sorbent, the molybdenum carbide is $\beta$-$Mo_2C$ and is present in an amount of at least 10 wt % based on a total weight of nanocomposite sorbent, and the molybdenum nitride is $\gamma$-$Mo_2N$ and is present in an amount of at least 10 wt % based on a total weight of nanocomposite sorbent.

The present disclosure also relates to a method of forming the nanocomposite sorbent, the method comprising heating a precursor mixture comprising amino triazole and a molybdenum source to a first temperature of 150 to 350° C. to form an intermediate product, and heating the intermediate product to a second temperature of 500 to 1100° C. to form the nanocomposite sorbent.

In some embodiments, the precursor mixture is formed by mixing amino triazole and the molybdenum source in a solvent, and removing the solvent to form the precursor mixture.

In some embodiments, the molybdenum source is ammonium molybdate.

In some embodiments, the heating of the precursor mixture and the heating of the intermediate product are both performed under inert atmosphere.

The present disclosure also relates to a membrane filter, comprising a polymer and the nanocomposite sorbent.

In some embodiments, the polymer is at least one selected from the group consisting of cellulose acetate, polyamide, polyvinylidene fluoride, polytetrafluoroethylene, poly(tetrafluoroethylene-co-hexafluoropropylene), poly (tetrafluoroethylene-co-perfluoro(alkylvinyl ether)), poly(ethylene-co-tetrafluoroethylene), poly(chlorotrifluoroethylene), poly (chlorotrifluoroethylene-co-ethylene), polyvinylfluoride, polysulfone, polyethersulfone, polyvinyl chloride, polyimide, polyacrylonitrile, polyethylene glycol, polyvinyl alcohol, poly(methacrylic acid), poly(arylene ether ketone), poly (ether imide), polyaniline, and polyethersulfone amide.

In some embodiments, the polymer is a fluorine-containing polymer selected from the group consisting of polyvinylidene fluoride, polytetrafluoroethylene, poly(tetrafluoroethylene-co-hexafluoropropylene), poly (tetrafluoroethylene-co-perfluoro(alkylvinyl ether)), poly (ethylene-co-tetrafluoroethylene), poly(chlorotrifluoroethylene), poly(chlorotrifluoroethylene-co-ethylene), and polyvinylfluoride.

In some embodiments, the nanocomposite sorbent is present in the membrane filter in an amount of 0.25 to 10 wt %, based on a total weight of membrane filter.

In some embodiments, the membrane filter has a water contact angle of 96° to 75°.

In some embodiments, the membrane filter has a thickness of 100 to 200 μm and a pure water flux of 27.5 to 75 L/m²-h.

In some embodiments, the membrane filter has a surface area of greater than 14.6 to 20 m²/g and a pore volume of 0.010 to less than 0.035 cm³/g.

The present disclosure also relates to a method of removing an organic pollutant from water comprising contacting water containing an organic pollutant with the nanocomposite sorbent, and recovering the nanocomposite sorbent, wherein the organic pollutant is at least one selected from the group consisting of a dye, a phenol, a polycyclic aromatic hydrocarbon, an herbicide, a pesticide, and a persistent organic pollutant.

The present disclosure also relates to a method of removing an organic pollutant from water comprising:

contacting water containing an organic pollutant with the membrane filter, and recovering the membrane filter, wherein the organic pollutant is at least one selected from the group consisting of a dye, a phenol, a polycyclic aromatic hydrocarbon, an herbicide, a pesticide, and a persistent organic pollutant.

In some embodiments, the organic pollutant is a thiazine, a salt, solvate, tautomer, or stereoisomer thereof.

In some embodiments, the method removes greater than 77.5% of an initial amount of organic pollutant present.

In some embodiments, the method further comprises eluting the organic pollutant from the membrane filter to produce a regenerated membrane filter having a pure water flux which is at least 75% of an initial pure water flux of the membrane filter.

BRIEF DESCRIPTION OF THE DRAWINGS

FIG. 3G is a TEM image of calcined NMoC@Mo.

FIG. 3H shows a selected area electron diffraction (SAED) pattern of the image shown in FIG. 3G.

FIG. 4A shows the PXRD spectra of NMoC@Mo nanocomposite material.

FIG. 5A shows the effect of contact time, FIG. 5B shows the effect of pH on MB removal, FIG. 5C shows the evolution of UV-vis absorption spectra for MB corresponding to different time intervals, Fig. 5D shows the effect of adsorbent dose, FIG. 5E shows the effect of initial dye concentration on MB removal, and FIG. 5F shows the evolution of UV-vis absorption spectra for MB corresponding to different adsorbent doses.

FIG. 6D is for pseudo first-order kinetics, FIG. 6E is for pseudo second-order kinetics, and FIG. 6F is for adsorption thermodynamics plots for MB dye adsorption.

FIG. 7A is a plot of pure water flux and water contact angle for various NMoC@Mo nanosheets modified PVDF membranes.

FIG. 7B is a plot of pure water flux and permeate water flux for various NMoC@Mo nanosheets modified PVDF membranes.

FIG. 7C is a plot of the rejection efficiency for various NMoC@Mo nanosheets modified PVDF membranes at two concentrations of MB dye.

FIG. 7D is an illustration of MB dye retained on M-40 membrane after filtration process.

FIG. 8G is for carbon, FIG. 8H is for oxygen, FIG. 8I is for molybdenum, and FIG. 8J is for fluorine.

DETAILED DESCRIPTION OF THE INVENTION

Figure 1:
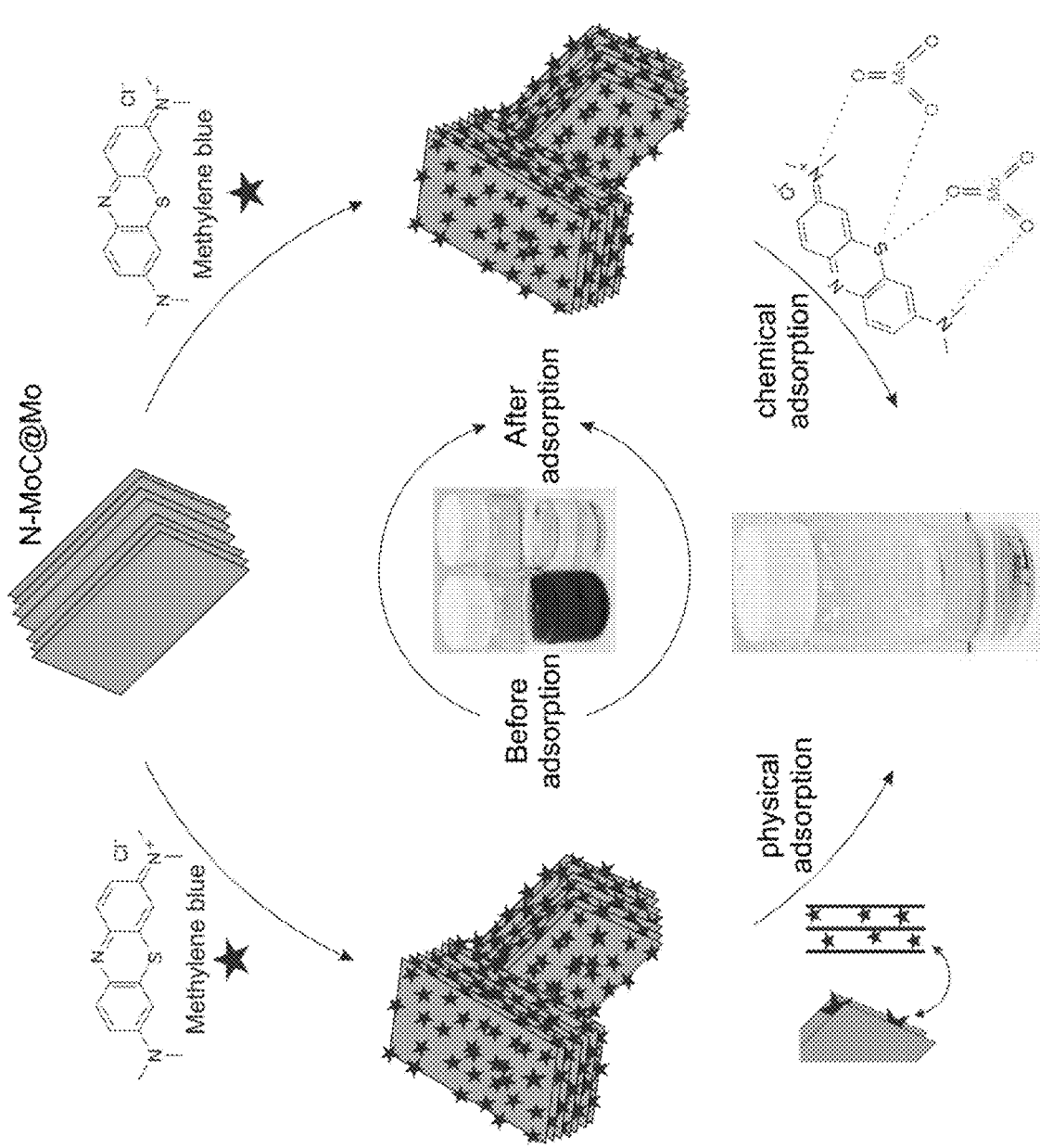
FIG. 1 is an illustration of adsorption of MB dye using NMoC@Mo nanosheets.

In the following description, it is understood that other embodiments may be utilized and structural and operational changes may be made without departure from the scope of the present embodiments disclosed herein.

Definitions

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

As used herein, the term "ceramic" refers to a material which is an inorganic, non-metallic oxide, nitride, or carbide.

According to a first aspect, the present disclosure relates to a nanocomposite sorbent, comprising molybdenum carbide, molybdenum nitride, and molybdenum oxide. These materials may be collectively referred to as "molybdenum ceramics", "molybdenum ceramic materials", or other similar term.

In general, the nanocomposite sorbent may comprise the molybdenum carbide, molybdenum nitride, and molybdenum oxide in any relative amount. In some embodiments, the nanocomposite sorbent comprises substantially equal (i.e. to within 5 wt %) amounts of the molybdenum carbide, molybdenum nitride, and molybdenum carbide. In some embodiments, the nanocomposite sorbent comprises substantially equal amounts of molybdenum carbide and molybdenum nitride. In some embodiments, the nanocomposite sorbent comprises a ratio of a sum of the amounts of molybdenum carbide and molybdenum nitride to an amount of molybdenum oxide of 1:2 to 2:1, preferably 1:1.75 to 1.75:1, preferably 1:1.5 to 1.5:1, preferably 1:1.25 to 1.25:1, preferably 1:1.2 to 1.2:1, preferably 1:1.15 to 1.15:1, preferably 1:1.10 to 1.10:1, preferably 1:1.05 to 1.05:1, preferably 1:1. In some embodiments, the nanocomposite sorbent comprises at least 10 wt %, preferably at least 12.5 wt %, preferably at least 15 wt %, preferably at least 17.5 wt %, preferably at least 20 wt %, preferably at least 22.5 wt %, preferably at least 25 wt % molybdenum nitride, based on a total weight of nanocomposite sorbent. In some embodiments, the nanocomposite sorbent comprises at least 10 wt %, preferably at least 12.5 wt %, preferably at least 15 wt %, preferably at least 17.5 wt %, preferably at least 20 wt %, preferably at least 22.5 wt %, preferably at least 25 wt % molybdenum carbide, based on a total weight of nanocomposite sorbent. In some embodiments, a majority of the nanocomposite sorbent is molybdenum oxide by weight. That is, the molybdenum oxide is present in an amount of greater than 50 wt %. In some embodiments, the molybdenum oxide is present in an amount of at least 52.5 wt %, preferably at least 55 wt %, preferably at least 57.5 wt %, preferably at least 60 wt %, based on a total weight of nanocomposite sorbent.

In some embodiments, the molybdenum carbide is crystalline by PXRD. In some embodiments, the molybdenum nitride is crystalline by PXRD. In some embodiments, the molybdenum oxide is crystalline by PXRD. In some embodiments, the molybdenum carbide, molybdenum nitride, and molybdenum oxide are each crystalline by PXRD. The molybdenum oxide may be any suitable phase of molybdenum oxide, examples of which include, but are not limited to orthorhombic $MoO_3$, monoclinic (also referred to as β) $MoO_3$, and $MoO_2$. In preferred embodiments, the molybdenum oxide is monoclinic $MoO_3$. The molybdenum carbide may be any suitable phase of molybdenum carbide, examples of which include, but are not limited to γ-MoC, γ'-MoC, and β-$Mo_2C$. In preferred embodiments, the molybdenum carbide is β-$Mo_2C$. The molybdenum nitride may be any suitable phase of molybdenum nitride, examples of which include, but are not limited to, γ-$Mo_2N$, β-$Mo_2N$, δ-MoN, and cubic MoN. In preferred embodiments, the molybdenum nitride is γ$Mo_2N$.

The nanocomposite sorbent is in the form of nanosheets. The nanosheets can have a mean size of 10 to 100 μm, preferably 12.5 to 95 μm, preferably 15 to 90 μm, preferably 17.5 to 85 μm, preferably 20 to 80 μm, preferably 22.5 to 75 μm, preferably 25 to 70 μm, preferably 27.5 to 65 μm, preferably 30 to 60 μm. Such a mean size may refer to a length or a width of the nanosheets. In some embodiments, the nanosheets have a mean length which is substantially equal to (i.e. within 5%) a mean width of the nanosheets. In some embodiments, the nanosheets have a ratio of length to width of 10:1 to 1:10, preferably 9:1 to 1:9, preferably 8:1 to 1:8, preferably 7:1 to 1:7, preferably 6:1 to 1:6, preferably 5:1 to 1:5, preferably 4:1 to 1:4, preferably 3:1 to 1:3, preferably 2:1 to 1:2, preferably 1.5:1 to 1:1.5, preferably 1:1. Such nanosheets may also be characterized by a mean sheet area. The sheet area is calculated by the product of the length and width. In some embodiments, the nanosheets have a mean sheet area of 100 to 10,000 μm, preferably 200 to 9,000 μm, preferably 300 to 8,000 μm, preferably 400 to 7,500 μm, preferably 500 to 7,000 μm, preferably 550 to 6,500 μm, preferably 600 to 6,000 μm, preferably 650 to 5,500 μm, preferably 700 to 5,000 μm, preferably 750 to 4,500 μm, preferably 800 to 4,250 μm, preferably 850 to 4,000 μm, preferably 900 to 3,750 μm. The nanosheets can also be characterized by a mean thickness. The nanosheets may have a mean thickness of 10 to 1000 nm, preferably 15 to 950 nm, preferably 20 to 900 nm, preferably 25 to 850 nm, preferably 30 to 800 nm, preferably 35 to 750 nm, preferably 40 to 700 nm, preferably 45 to 650 nm, preferably 50 to 600 nm, preferably 55 to 550 nm, preferably 60 to 500 nm.

In some embodiments, the nanosheets of the present disclosure have a monodisperse size, having a coefficient of variation or relative standard deviation, expressed as a percentage and defined as the ratio of the nanosheet size standard deviation (G) to the nanosheet size mean (μ) multiplied by 100 of less than 25%, preferably less than 10%, preferably less than 8%, preferably less than 6%, preferably less than 5%, preferably less than 4%, preferably less than 3%, preferably less than 2%. In some embodiments, the nanosheets of the present disclosure are monodisperse having a nanosheet size distribution ranging from 80% of the average nanosheet size to 120% of the average nanosheet size, preferably 90-110%, preferably 95-105% of the average particle size. In some embodiments, the nanosheets do not have a monodisperse size. In some embodiments, the nanosheets of the present disclosure have a monodisperse thickness, having a coefficient of variation or relative standard deviation, expressed as a percentage and defined as the ratio of the nanosheet thickness standard deviation (σ) to the nanosheet thickness mean (μ) multiplied by 100 of less than 25%, preferably less than 10%, preferably less than 8%, preferably less than 6%, preferably less than 5%, preferably less than 4%, preferably less than 3%, preferably less than 2%. In some embodiments, the nanosheets of the present disclosure are monodisperse having a nanosheet thickness distribution ranging from 80% of the average nanosheet thickness to 120% of the average nanosheet thickness, preferably 90-110%, preferably 95-105% of the average particle size. In some embodiments, the nanosheets do not have a monodisperse thickness.

In some embodiments, the nanosheets exist as stacks. Such stacks may have a mean distance between nanosheets of 2 to 20 nm, preferably 2.5 to 19 nm, preferably 3 to 18 nm, preferably 3.5 to 17.5 nm, preferably 4 to 17 nm, preferably 4.5 to 16.5 nm, preferably 5 to 16 nm, preferably 5.5 to 15.5 nm, preferably 6 to 15 nm, preferably 6.5 to 14.5 nm, preferably 7 to 14 nm preferably 7.5 to 13.5 nm. Such stacks may have any suitable number of nanosheets. The stacks may contain any number of nanosheets. The minimum number of nanosheets which may be present in such a stack is two, as otherwise the single nanosheet would not be considered a stack. No specific maximum number of nanosheets which may be present in a stack exists. In some embodiments, the stacks have a mean number of nanosheets of 2 to 100, preferably 3 to 75, preferably 4 to 60, preferably 5 to 50 nanosheets.

The present disclosure also relates to a method of forming the nanocomposite sorbent, the method comprising heating a precursor mixture comprising amino triazole and a molybdenum source to a first temperature of 150 to 350° C. to form an intermediate product, and heating the intermediate product to a second temperature of 500 to 1100° C. to form the nanocomposite sorbent.

In general, the molybdenum source may be any suitable molybdenum-containing material. In some embodiments, the molybdenum source is a salt or coordination compound comprising a molybdenum atom. In such a salt or coordination compound, the molybdenum atom may be in any oxidation state, such as $-4$, $-2$, $-1$, $0$, $+1$, $+2$, $+3$, $+4$, $+5$, or $+6$. Such a salt or coordination compound may contain other atoms, ions, or molecules which act to charge balance or to fill the coordination sphere about the molybdenum atom. Examples of such atoms, ions, or molecules include, but are not limited to halides such as chloride, bromide, and iodide; nitrate; acetate; sulfate; sulfite; carbon monoxide; mesitylene; cyclopentadiene; phosphate; alkyl ligands such as methyl, ethyl, and isopropyl; and alkoxide ligands such as methoxide, ethoxide, and isopropoxide. In some embodiments, the molybdenum source is a salt or coordination compound comprising a molybdate ion. It should be understood that as used herein, the term "molybdate ion" refers to both the oxoanion $MoO_4^{-2}$ commonly referred to as simply "molybdate" as well as related oxoanions which comprise multiple molybdenum metal centers which may be connected through oxygen atoms to form discrete or polymeric structures such as dimolybdate ($Mo_2O_7^{2-}$), trimolybdate ($Mo_3O_{10}^{-2}$), tetramolybdate ($Mo_4O_{13}^{-2}$), and the like. In preferred embodiments, the molybdenum source is ammonium molybdate.

The precursor mixture may be formed by any suitable mixing technique. In some embodiments, solid forms of the amino triazole and molybdenum may be mixed as solids by a technique such as stirring, grinding, milling, or the like. In some embodiments, the precursor mixture is formed by mixing amino triazole and the molybdenum source in a solvent and removing the solvent. In such embodiments, the solvent may be any suitable liquid, such as water and an organic solvent such as alcohols such as methanol, ethanol, n-propanol, 2-propanol (also known as isopropanol), ethylene glycol, diethylene glycol, and glycerol; hydrocarbons such as pentane, hexane, and heptane; ketones such as acetone and methyl ethyl ketone; esters such as ethyl acetate; amides such as dimethylformamide; ethers such as tetrahydrofuran, diglyme, and diethyl ether; nitriles such as acetonitrile; halogenated organic solvents such as methylene chloride (also known as dichloromethane), carbon tetrachloride, and chloroform; aromatic organic solvents such as benzene and xylene; amines such as trimethylamine and pyridine; and mixtures thereof. In some embodiments, the solvent is ethanol. In some embodiments, the solvent is water. In some embodiments, the molybdenum source is dissolved or suspended in water and the amino triazole is dissolved or suspended in ethanol and the solvent formed on mixing is a mixture of water and ethanol.

In general, the solvent may be removed by any suitable means. That is, the solid precursor mixture may be separated from the solvent by any suitable method or with any suitable equipment for separating a solid and liquid known to one of ordinary skill in the art, such as decantation, centrifugation, filtration, evaporation, and distillation. The removal of the solvent may involve heating the precursor mixture to a temperature below 150° C., preferably below 125° C., preferably below 100° C., preferably below 90° C., preferably below 85° C. Such heating may be advantageous for ensuring complete removal of the solvent The precursor mixture is heated to a first temperature of 150 to 350° C., preferably 175 to 325° C., preferably 200 to 300° C., preferably 210 to 290° C., preferably 220 to 280° C., preferably 230 to 270° C., preferably 240 to 260° C., preferably 250° C. The heating may be performed under an inert atmosphere. Such an inert atmosphere may be provided by nitrogen, helium, argon, neon, or other suitable inert gas or mixture thereof. The inert atmosphere may be static or may have a flow of one or more gases. In some embodiments, the precursor mixture is heated for 0.5 to 6 hours, preferably 0.75 to 5 hours, preferably 1 to 4 hours, preferably 1.25 to 3.5 hours, preferably 1.5 to 3 hours, preferably 1.75 to 2.5 hours, preferably 2 hours. The heating of the precursor mixture creates an intermediate product. The intermediate product is heated to a second temperature of 500 to 1100° C., preferably 550 to 1050° C., preferably 600 to 1000° C., preferably 650 to 950° C., preferably 700 to 900° C., preferably 725 to 875° C., preferably 750 to 850° C., preferably 775 to 825° C., preferably 800° C. to form the nanocomposite sorbent. The heating of the intermediate product may be performed under an inert atmosphere as described above. In some embodiments, the intermediate product is heated for 1 to 12 hours, preferably 2 to 10 hours, preferably 3 to 9 hours, preferably 4 to 8 hours, preferably 5 to 7 hours, preferably 6 hours.

The present disclosure also relates to a membrane filter comprising a polymer and the nanocomposite sorbent. In some embodiments, the polymer is at least one selected from the group consisting of cellulose acetate, polyamide, polyvinylidene fluoride, polytetrafluoroethylene, poly(tetrafluoroethylene-co-hexafluoropropylene), poly (tetrafluoroethylene-co-perfluoro(alkylvinyl ether)), poly(ethylene-co-tetrafluoroethylene), poly(chlorotrifluoroethylene), poly (chlorotrifluoroethylene-co-ethylene), polyvinylfluoride, polysulfone, polyethersulfone, polyvinyl chloride, polyimide, polyacrylonitrile, polyethylene glycol, polyvinyl alcohol, poly(methacrylic acid), poly(arylene ether ketone), poly (ether imide), polyaniline, and polyethersulfone amide.

In some embodiments, the polymer is a fluorine-containing polymer selected from the group consisting of polyvinylidene fluoride, polytetrafluoroethylene, poly(tetrafluoroethylene-co-hexafluoropropylene), poly (tetrafluoroethylene-co-perfluoro(alkylvinyl ether)), poly (ethylene-co-tetrafluoroethylene), poly(chlorotrifluoroethylene), poly(chlorotrifluoroethylene-co-ethylene), and polyvinylfluoride. In preferred embodiments, the polymer is polyvinylidene difluoride (PVDF).

In some embodiments, the nanocomposite sorbent is present in the membrane filter in an amount of 0.25 to 10 wt %, preferably 0.5 to 9.5 wt %, preferably 1 to 9 wt %, preferably 1.25 to 8.5 wt %, preferably 1.5 to 8 wt %, preferably 1.75 to 7.75 wt %, preferably 2 to 7.5 wt %, preferably 2.25 to 7.25 wt %, preferably 2.5 to 7 wt %, preferably 2.75 to 6.75 wt %, preferably 3 to 6.5 wt %, based on a total weight of membrane filter.

In some embodiments, the membrane filter has a water contact angle of 96° to 75°, preferably 95° to 77.5°, preferably 92.5° to 78°, preferably 90° to 80°. In some embodiments, the membrane filter has a thickness of 100 to 200 μm, preferably 105 to 190 μm, preferably 110 to 180 μm, preferably 115 to 170 μm, preferably 120 to 160 μm, preferably 125 to 155 μm, preferably 130 to 150 μm, preferably 135 to 145 μm, preferably 140 μm. In some embodiments, the membrane filter has a pure water flux of 27.5 to 75 L/m²-h, preferably 30 to 70 L/m²-h, preferably 32.5 to 65 L/m²-h, preferably 35 to 60 L/m²-h, preferably 37.5 to 57.5 L/m²-h, preferably 40 to 55 L/m²-h, preferably 42.5 to 54 L/m²-h. In some embodiments, the membrane filter has a surface area of greater than 14.6 to 20 m²/g, preferably 15 to 19 m²/g, preferably 16 to 18 m²/g. In some embodiments, the membrane filter has a pore volume of 0.010 to less than 0.035 cm³/g, preferably 0.015 to 0.0325 cm³/g, preferably 0.020 to 0.030 cm³/g, preferably 0.025 to 0.029 cm³/g, preferably 0.026 to 0.028 cm³/g, preferably 0.027 cm³/g.

The present disclosure also relates to a method for removing an organic pollutant from water using the nanocomposite sorbent described above. The present disclosure also relates to a method for removing an organic pollutant from water using the membrane filter described above. In some embodiments, only one organic pollutant is present in the water. In alternative embodiments, a plurality of organic pollutants is present in the water. The method involves contacting the nanocomposite sorbent or the membrane filter with water containing one or more organic pollutants.

In some embodiments, the organic pollutants may be a dye, a phenol, a polycyclic aromatic hydrocarbon, an herbicide, a pesticide, a persistent organic pollutant, or the like.

In some embodiments, the organic pollutant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red 0, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine , azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a] pyrene, corannulene, benzo[g,h,i]perylene, coronene, ovalene, benzo[c]fluorine, acenaphthene, acenaphthylene, benz [a]anthracene, benzo[b]fluoranthene, benzo[j]fluoranthene, benzo[k]fluoranthene, benzo[e]pyrene, cyclopenta[c,d] pyrene, dibenz[a,h]anthracene, dibenzo[a,e]pyrene, dibenzo [a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciprofloxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline. A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapirolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethyl-enedisulfotetramine, bromethalin, 2,4-dinitrophenol, and uragan D2.

A pesticide intended for use against viruses is known as a virucide. Examples of virucides are cyanovirin-N, grif-fithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichlo-roethane (DDT), dioxins, polychlorinated dibenzofurans, chlordecone, hexachlorocyclohexane ($\alpha$- and $\beta$-), hexabro-modiphenyl ether, lindane, pentachlorobenzene, tetrabromo-diphenyl ether, perfluorooctanesulfonic acid, endosulfans, and hexabromocyclododecane.

In some embodiments, the organic pollutant is a thiazine, a salt, solvate, tautomer, or stereoisomer thereof. As used herein, the term "a thiazine" refers to a compound which comprises or is a derivative of thiazine, an organic com-pound containing a six-membered ring comprising four carbon atoms, one nitrogen atom, and one sulfur atom. There are three isomers of thiazine which differ based on the relative positions of the nitrogen and sulfur atoms in the six-membered ring, 1,4-thiazine, 1,3-thiazine, and 1,2-thi-azine. The thiazine moiety present in the thiazine compound, a salt, solvate, tautomer, or stereoisomer thereof can be any of these isomers or combination of isomers. Many thiazine compounds comprise the thiazine moiety fused with addi-tional carbon rings, saturated or unsaturated. For example, phenothiazine, which comprises a pair of benzene rings fused by a 1,4-thiazine moiety, is a common constituent or moiety found in a wide variety of compounds which are dyes, pharmaceuticals, pesticides, and the like. Examples of phenothiazine compounds include, but are not limited to pharmaceuticals including acepromazine, chlorpromazine, promazine, triflupromazine, leomepromazine, methotrime-prazine, mesoridazine, thioridazine, fluphenazine, per-phenazine, prochloroperazine, and trifluoperazine; and dyes including methylene blue, methylene green, thionine, azure A, and toluidine blue.

In some embodiments, the nanocomposite sorbent may be free flowing or supported on or within a substrate, for example, a column. Examples of supported nanocomposite sorbents include materials and geometries where the nano-composite sorbent is supported within a fixed bed, a static packed bed, a fluidized bed, embedded in a porous support (such as a porous polymer matrix), in or on a ceramic support, in or on a polymer support, or in or on a silica support. In preferred embodiments, the nanocomposite sor-bent is employed in an amount of 0.1 to 20 mg/mL, preferably 0.25 to 15 mg/mL, preferably 0.5 to 12.5 mg/mL, preferably 0.75 to 10 mg/mL, preferably 1 to 5 mg/mL of water to have organic pollutants removed.

In some embodiments, the method involves addition of powdered nanocomposite sorbent to the water to have an organic pollutant be removed to form a purification mixture. In some embodiments, the purification mixture is shaken, stirred, agitated, or other method of achieving temporary homogeneity of the purification mixture. In preferred embodiments, the purification mixture is shaken at 10 to 1000 rpm, preferably 50 to 500 pm, preferably 125 to 250 rpm, preferably 150 rpm.

In alternative embodiments, the contacting comprises delivering a mixture into a feed side of a chamber compris-ing the nanocomposite sorbent and/or the membrane filter that divides the chamber into the feed side and a permeate side, such that at least a portion of the water permeates the nanocomposite sorbent and recovering from the permeate side purified water depleted in the organic pollutant com-pared to the water supplied to the feed side. The chamber used for the present method may be of any shape so long as the nanocomposite sorbent can be securely housed and utilized inside the chamber to accomplish the removal of the organic pollutant. The chamber may also include an inlet configured to accept feed material, a first outlet configured to expel a permeate, and an optional second outlet config-ured to expel a retentate. The chamber can be configured to be pressurized so as to push feed material though the inlet, permeate through the first outlet and optionally, retentate through the second outlet. The chamber can alternatively be configured to operate at reduced pressure as to pull feed material through the inlet, permeate out through the first outlet and optionally, retentate out through the second outlet. The chamber may also include a pump to provide a force for moving water from the feed side to the permeate side. In one or more embodiments, a force is provided to deliver the water into contact with the nanocomposite sorbent. The water may have a flow rate of 0.001 L/min to 1,000 L/min, 0.005 L/min to 500 L/min, 0.01 L/min to 100 L/min, 0.05 L/min to 10 L/min, 0.1 L/min to 5 L/min, or 0.5 L/min to 2 L/min. Alternatively, the water may stay stagnant over the nanocomposite sorbent and/or the membrane filter or be stirred, shaken, or agitated as previously described.

In some embodiments, the water used in the method has a temperature of 1 to 99° C., preferably 20 to 90° C., preferably 21 to 75° C., preferably 25 to 50° C. In some embodiments, the water has a pH of 6.5 to 14, preferably 6.6 to 13, preferably 6.75 to 12, preferably 7 to 11. In preferred embodiments, the water and the nanocomposite sorbent and/or membrane filter are in contact for 1 to 120 minutes, preferably 5 to 105 minutes, preferably 10 to 90 minutes.

In some embodiments, the contacting is performed by passing the water through the nanocomposite sorbent and/or membrane filter. In some embodiments, the nanocomposite sorbent and/or membrane filter may be used in series with other currently known adsorption materials to enhance the removal of an organic pollutant from water or to remove a different type of impurity from water that is not an organic pollutant.

In terms of the present disclosure, the adsorption inter-action between the organic pollutant and the nanocomposite sorbent and/or the polymer may be chemisorption, phy-sisorption, or mixtures thereof. In at least one embodiment, organic pollutant is adsorbed onto the nanocomposite sor-bent and/or the polymer via a physisorption process, mean-ing the process is primarily physical and preferably no chemical changes occur on the nanocomposite sorbent, the polymer, or organic pollutant.

In some embodiments, the purified water has least 77.5% less organic pollutant than that present in the water before contact with the nanocomposite sorbent and/or membrane filter, preferably at least 80% less, preferably at least 82.5% less, preferably at least 85% less, preferably at least 87.5% less, preferably at least 90% less, preferably at least 92.5% less, preferably at least 95% less, preferably at least 97.5% less, preferably at least 99% less than that present in the water before contact with the nanocomposite sorbent and/or the membrane filter. That is, the nanocomposite sorbent and/or membrane filter removes at least 77.5%, preferably at least 80%, preferably at least 82.5%, preferably at least 85%, preferably at least 87.5%, preferably at least 90%, preferably at least 92.5%, preferably at least 95%, preferably at least 97.5%, preferably at least 99% of an initial amount of organic pollutant present in the water. In a preferred embodiment, the purified water is substantially free of the organic pollutant, for example, the stream contains less than 10 ppm, preferably less than 1 ppm, preferably less than 100 ppb, preferably less than 1 ppb, preferably less than 0.1 ppb, preferably less than 1 ppt of the organic pollutant. In a most preferred embodiment, the purified water is devoid of the organic pollutant.

In one or more embodiments, the method of the present disclosure further involves eluting the organic pollutant from the nanocomposite sorbent and/or the membrane filter. After such eluting, the nanocomposite sorbent and/or the membrane filter may be reused. The eluting can be performed by any suitable method and using any suitable materials known to one of ordinary skill in the art. In some embodiments, the eluting is performed by washing the nanocomposite sorbent and/or the membrane filter which has adsorbed organic pollutants with a suitable wash solvent. The wash solvent can be any suitable solvent, such as water, a surfactant solution, an organic solvent, or mixtures thereof. The washing may take place with agitation, such as stirring or ultrasonication or may take place without agitation. Following the eluting, the nanocomposite sorbent may be referred to as a "regenerated sorbent" and the membrane filter may be referred to as a "regenerated membrane filter". The nanocomposite sorbent and/or membrane filter of the present disclosure may be regenerated (i.e. eluted) and reused up to 2 cycles with a loss of no greater than 10 percent, preferably no greater than 9 percent, preferably no greater than 8 percent, preferably no greater than 7 percent, preferably no greater than 6 percent, preferably no greater than 5 percent, preferably no greater than 4 percent, preferably no greater than 3 percent, preferably no greater than 2 percent, preferably no greater than 1 percent in an organic pollutant uptake capacity, preferably up to 15 cycles, preferably up to 25 cycles, preferably up to 50 cycles, preferably up to 100 cycles, preferably up to 150 cycles, preferably up to 200 cycles, preferably up to 250 cycles, preferably up to 300 cycles, preferably up to 350 cycles, preferably up to 400 cycles, preferably up to 500 cycles, preferably up to 625 cycles, preferably up to 750 cycles, preferably up to 1,000 cycles. The nanocomposite sorbent and/or membrane filter of the present disclosure may be regenerated (i.e. eluted) and reused up to 2 cycles with a loss of no greater than 10 percent, preferably no greater than 9 percent, preferably no greater than 8 percent, preferably no greater than 7 percent, preferably no greater than 6 percent, preferably no greater than 5 percent, preferably no greater than 4 percent, preferably no greater than 3 percent, preferably no greater than 2 percent, preferably no greater than 1 percent in the pure water flux, preferably up to 15 cycles, preferably up to 25 cycles, preferably up to 50 cycles, preferably up to 100 cycles, preferably up to 150 cycles, preferably up to 200 cycles, preferably up to 250 cycles, preferably up to 300 cycles, preferably up to 350 cycles, preferably up to 400 cycles, preferably up to 500 cycles, preferably up to 625 cycles, preferably up to 750 cycles, preferably up to 1,000 cycles. The regenerated membrane filter has a pure water flux of at least 75%, preferably at least 77.5%, preferably at least 80%, preferably at least 82.5%, preferably at least 85%, preferably at least 87.5%, preferably at least 90%, preferably at least 92.5%, preferably at least 95%, preferably at least 97.5%, preferably at least 99% of an initial pure water flux.

The examples below are intended to further illustrate protocols for preparing and characterizing the nanocomposite sorbent, preparing and characterizing the membrane filter, and for performing method of removing an organic pollutant and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Materials

Ammonium molybdate tetrahydrate ($(NH_4)_6Mo_7O_{24} \cdot 4H_2O$), Amino triazole ($C_2H_4N_4$), AMT, and absolute ethanol, were obtained from Sigma Aldrich. Methylene Blue dye was bought from Merck. Polyvinylidene fluoride (HSV 900 PVDF) and 1-methyl-2-pyrrolidone (NMP) with analytical purity of 99.5%, were used and supplied by MTI corporation. Throughout all the experiments, deionized (DI) water was used.

Synthesis of Nitrogen Doped $Mo_2C@MoO_3$ Nanosheets

A solution of amino triazole (ATri) was prepared by adding ethanol. Under constant agitation speed; the prepared solution was then slowly added to the AMT solution at ambient temperature. Three precursors with different weight fractions AMT/ATri: 0.5, 1, and 2 were synthesized. After uniform mixing for 60 minutes, the mixture was dried completely in a standard oven at 80° C. The dried sample was further ground, followed by in situ thermal treatment in a quartz tube under nitrogen flow (30 $cm^3$/min) with a temperature ramping at 10° C. $min^{-1}$. The temperature was raised in two steps. First, the samples were heated from normal room temperature to 250° C. for 2 hours and then further heated to 800° C. for 6 hours. After heating, the system was cooled down under an inert atmosphere, and the grey-colored powdered sample was obtained.

Batch Adsorption Studies

The effect of various parameters such as contact time, pH, adsorbent dose, and initial dye concentration on the removal of textile dye, methylene blue (MB), was studied by conducting batch adsorption experiments. Throughout all experiments, 2 mL of MB solution in a 2 mL test tube was agitated on a laboratory agitator at 500 rpm under ambient temperature conditions. Dose of NMoC@Mo, pH of the reaction mixture, contact time of sorption and initial MB concentration were varied from 1 mg-5 mg, 2-12, 1 min-10 min, and 10 ppm-300 ppm, respectively. pH of the solutions was adjusted by adding 0.1 N NaOH and 0.1 N HCl.

After each sorption analysis, samples were removed, centrifuged at 8.000 rpm for 1 min, and then the residual MB concentration in the supernatant was determined using a UV/Vis spectrophotometer (Nanodrop 2000 C) at 665 nm. The removal percentage of MB was calculated using the following relationship (Eq. (1)):

$$\% \; MB \; \text{removal} = \frac{(C_o - C_t)}{C_o} \times 100 \qquad (1)$$

Where $C_o$ (ppm) and $C_t$ (ppm) are the initial dye concentration and concentration after a certain time t, respectively. All experiments were performed in triplicate and average values of parameters were obtained.

To study the role of temperature during adsorption process (thermodynamic studies), sorption experiments were conducted at varying temperatures such as 15° C., 25° C., 35° C., and 45° C. for 7 minutes. Thermodynamic variables such as enthalpy ($\Delta H°$), free energy ($\Delta G°$), and entropy ($\Delta S°$), were calculated to study the feasibility and spontaneity of the adsorption process using the following equations (Eq. (2)-Eq. (4)):

$$\Delta G° = -RT\ln K_c \qquad (2)$$

$$\Delta G° = \Delta H° - T\Delta S° \qquad (3)$$

$$\log K_c = \frac{\Delta S^0}{2.303R} - \frac{\Delta H^0}{2303RT} \qquad (4)$$

Where R, T and $K_c$ correspond to universal gas constant (8.314 J $K^{-1}$. mol), temperature (K), and equilibrium constant, respectively.

Kinetic studies were carried out with an initial MB concentration of 100 ppm, at ambient temperature conditions, to evaluate the sorption behavior of MB across various time intervals (1 min-7 min). Pseudo-first-order kinetic model and pseudo-second-order kinetic models were used to evaluate the effect of MB adsorption rate onto the adsorbent surface.

The equations (Eq. (5) and Eq. (6)) used for kinetic models are as follows:

For pseudo first-order kinetics:

$$\ln(q_e - q_t) = \ln q_e - \frac{k_1}{2.303}t \qquad (5)$$

For pseudo second-order kinetics:

$$\frac{t}{q_t} = \frac{t}{k_2 q_e^2} + \frac{1}{q_e}t \qquad (6)$$

Where $q_e$ (mg $g^{-1}$) and $q_t$ (mg $g^{-1}$) represent adsorption capacities at equilibrium and at any time t, respectively. $k_1$ ($h^{-1}$) and $k_2$ (g $mg^{-1} \cdot h^{-1}$)) are the rate constants for pseudo-first order and pseudo-second-order kinetics, respectively.

Isothermal adsorption experiments were performed by varying MB concentrations (200 ppm-500 ppm), at an equilibrium time interval of 7 min. To simulate the sorption behavior of MB onto adsorbent, Langmuir, Freundlich, and Temkin isotherm models were studied. The equations (Eq. (7)-Eq. (9)) used for isotherm models are given below:

Langmuir model:

$$\frac{C_e}{q_e} = \frac{C_e}{q_m} + \frac{1}{q_m K_L} \qquad (7)$$

Freundlich model:

$$\log q_e = \log K_f + \frac{1}{n}\log C_e \qquad (8)$$

Temkin model:

$$q_e = \beta \; \ln \; \alpha + \beta \; \ln \; C_e \qquad (9)$$

Also, $$\beta = \frac{RT}{b_T} \; \text{and} \; \alpha = A_T$$

Where, $q_e$ (mg $g^{-1}$) represents the equilibrium adsorption capacity at different initial MB concentrations, $q_m$ (mg $g^{-1}$) represents the theoretical maximum monolayer absorption capacity, $C_e$ (ppm) refers to the MB concentration when equilibrium; $K_L$ (L $mg^{-1}$) and $K_F$ (mg $g^{-1}$) are the adsorption coefficients of the Langmuir and Freundlich parameters, respectively, and n represents the Freundlich parameter, indicating the adsorption intensity. T shows absolute temperature in Kelvin, R is the universal gas constant, 8.314 J $mol^{-1}$ $K^{-1}$, $b_T$ is the Temkin constant related to the heat of sorption (J $mg^{-1}$), and $A_T$ is the equilibrium binding constant corresponding to the maximum binding energy (L $g^{-1}$).

FIG. 1 shows the illustration of the adsorption process of MB dye molecules onto the potential adsorbent (NMoC@Mo). The figure describes that MB dye molecules got entrapped onto the surface as well as between the adsorbent nanosheets, thus resulting in excellent (approximately 100%) removal from an aqueous solution.

Membrane Preparation Method

Figure 2B:
FIG. 2B is a depiction of the measurement of membrane thickness using a micrometer gauge.
Figure 2A:
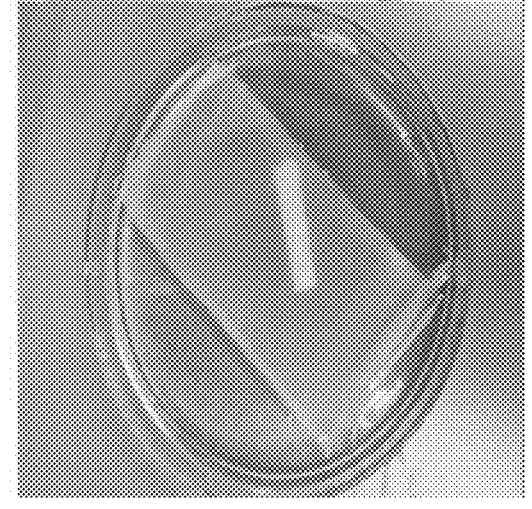
FIG. 2A is a photograph of a synthesized M-40 membrane.

The immersion precipitation method was applied for the synthesis of pure PVDF, and nanocomposite PVDF membranes. For the pure PVDF membrane synthesis, 17 wt % PVDF powder was slowly added to the NMP solvent (based on the total weight of the solution) under constant stirring, and further, the solution was stirred for 8 hours at 60° C., to get a homogeneous dope mixture. For the preparation of nanocomposite membranes, firstly, 17 wt % PVDF was slowly added to the NMP solvent under constant agitation and then, after stirring for 2 hours at 60° C., 5 mL PVDF mixture was transferred to three different glass beakers of 25 mL, followed by the addition of three concentrations (10 mg, 40 mg, and 60 mg) of NMoC@Mo nanosheets in each respective beaker. The prepared M-40 membrane can be visualized in FIG. 2A. Thereafter, the mixtures were stirred for 6 hours at 60° C. until homogenous solutions were obtained. All prepared solutions were degassed by placing them in an ultrasonic water bath (Branson 2800) at 30° C., for 2 hours. After degassing, all solutions were cast on a flat steel plate with 140 µm thickness (FIG. 2B). The casting films were immediately immersed in a water bath containing deionized (DI) water at 30° C. and then placed in fresh DI water for 24 hours to remove the excess solvent. The synthesized membranes were kept in distilled water and placed in a refrigerator (−4° C.). In each experiment, the desired membrane was dried for 45 minutes at room temperature and then used immediately for the membrane performance studies. The pure PVDF membrane was referred to as M0 and taken up as the base case, whereas nanocomposite membranes with different concentrations of NMoC@Mo such as 10 mg, 40 mg, and 60 mg, were termed as M-10, M-40, and M-60, respectively.

Characterization of NMoC@Mo Nanosheets

FTIR analysis of the synthesized nanosheets was conducted to investigate the presence of various functional groups in the sample, using Perkin Elmer Fourier-transform infrared (FT-IR) spectrophotometer Spectrum Two™ within the wavelength range between 4000-400 cm$^{-1}$, at resolution (4 cm$^{-1}$). Powder X-ray diffraction (XRD) measurements were performed by using Rigaku miniFlex. The surface morphology was studied through scanning electron microscopy (SEM) (TESCAN Vega3). Elemental analysis and chemical composition of the prepared materials were carried out using SEM equipped with energy dispersive X-rays (EDX) spectroscopy (EDAX). The detailed morphology and structure of the NMoC@Mo before and after calcination was studied by transmission electron microscopy (TEM) and electron diffraction (FEI, Morgagni 268 at 80 kV). Surface hydrophilicity of the unmodified and modified membranes was investigated by contact angle value using a contact angle meter Biolin Scientific Attention Theta Flex).

Evaluation of Membrane Performance

Figure 2C:
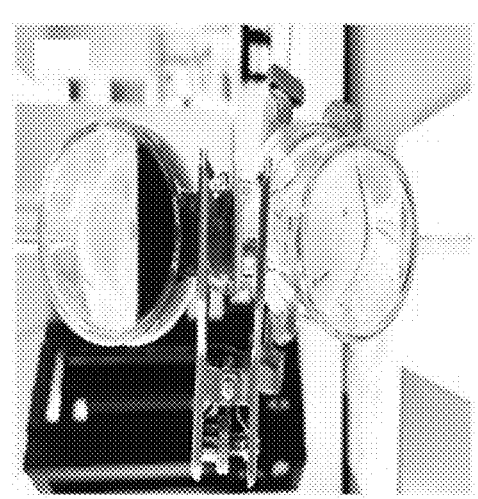
FIG. 2C is a photograph showing the rejection efficiency analysis of MB dye using lab scale filtration assembly

Membrane performance in terms of permeation, antifouling, and dye rejection ability was estimated by a laboratory-scale filtration unit consisting of two cells with an effective area (3.46 cm$^2$) of membrane and capacity of 50 ml. The membrane was fixed between the two cells using gaskets to avoid any leakages. The feed was sent to one cell, and the permeate was collected in the other cell. The membrane was gravity-driven and worked under atmospheric pressure without the assistance of complex pressure gauges. The water was passed through the membrane at room pressure and temperature (25° C.) to obtain pure water flux. For the evaluation of membrane rejection efficiency, MB dye aqueous solutions of 100 ppm and 200 ppm were used. FIG. 2C illustrates the rejection analysis of dye during the filtration process and the significant change in MB dye color before and after the process. A UV-spectrophotometer determined the concentrations of MB in the permeate and feed solution at 665 nm.

Pure water flux and dye rejection efficiency were measured using the following equations (Eq. (10) and Eq. (11)), respectively.

$$J_w = \frac{V}{A \times t} \tag{10}$$

Where $J_w$ indicates pure water flux (L/m$^2$-h), A corresponds to the area of membrane (m$^2$), V is the amount of permeate pure water collected (L), and t is the permeate time (h), respectively.

$$R(\%) = \left(1 - \frac{C_p}{C_f}\right) \times 100 \tag{11}$$

R (%) corresponds to the membrane rejection efficiency, $C_f$ is the concentration of MB dye in feed and $C_p$ is the concentration of dye permeate.

To assess the antifouling performance of membranes, flux recovery ratio (FRR) was calculated for pure PVDF and all synthesized nanocomposite membranes. For this purpose, after the experiment of dye removal, the membrane was brought out of the cell and washed with distilled water for 1 hour, followed by immersing the membrane in distilled water for 60 minutes. After 1 hour, the water flux was measured again. Each membrane went through two cleaning and two fouling cycles. FRR was calculated by following equation (Eq. (9));

$$FRR = \frac{J_{w2}}{J_{w1}} \tag{12}$$

Where $J_{W1}$ and $J_{w2}$ correspond to pure water flux of clean and fouled membrane (after cleaning), respectively.

To get better understanding about fouling of membranes, several equations have been used to explain the fouling resistance occurring during the filtration process, such as the total fouling resistance (TF), reversible fouling (RF), and irreversible fouling resistances (IRF) were calculated using following equations (Eq. (13)-Eq. (15));

$$TF(\%) = \left(1 - \frac{J_p}{J_{w1}}\right) \times 100 \tag{13}$$

$$RF(\%) = \left(\frac{J_{W2} - J_p}{J_{w1}}\right) \times 100 \tag{14}$$

$$IRF(\%) = \left(\frac{J_{W1} - J_{W2}}{J_{W1}}\right) \times 100 \tag{15}$$

Where TF is the sum of RF and IRF. $J_{w1}$, $J_{w2}$ and $J_p$ refer to the pure water flux, recovered pure water flux after cleaning and flux for permeate, respectively.

Results

Figures 3A, 3B, 3C, 3D, 3E, 3F:
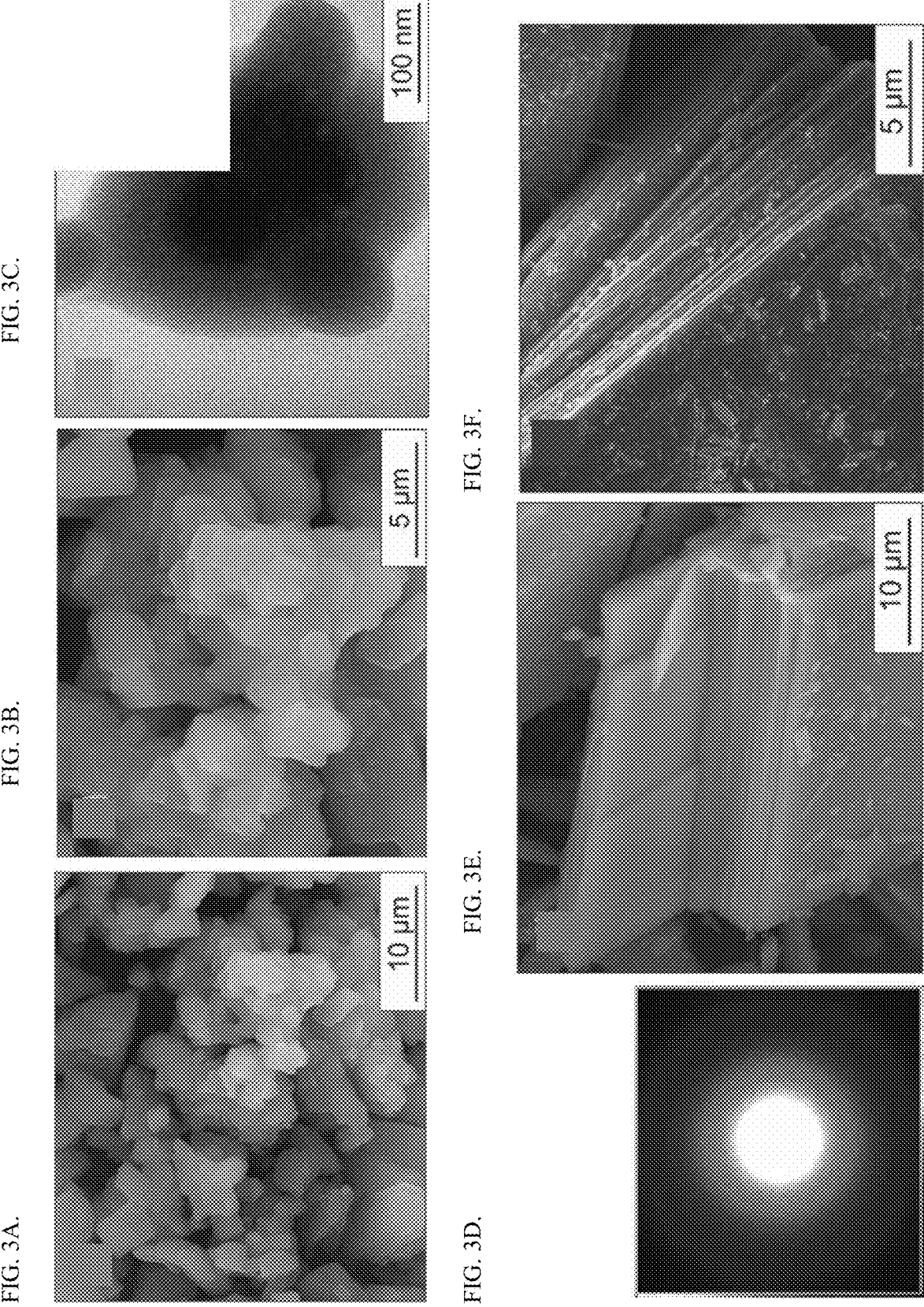
FIG. 3A is an SEM image of NMoC@Mo before calcination at low magnification.
FIG. 3B is an SEM image of NMoC@Mo before calcination at high magnification
FIG. 3C is a TEM image of NMoC@Mo before calcination.
FIG. 3D shows a selected area electron diffraction (SAED) pattern of the image shown in FIG. 3C.
FIG. 3E is an SEM image at low magnification of calcined NMoC@Mo.
FIG. 3F is an SEM image at high magnification of calcined NMoC@Mo.

The morphology and structure of the prepared products, both calcined (NMoC@Mo) and uncalcined (AMT-Atri) were further evaluated by SEM, TEM and Selected area (electron) diffraction (SAED) (FIGS. 3A-3H). FIGS. 3A and 3E showed the SEM micrographs of the NMoC@Mo before and after calcination for comparison. It can be observed that before calcination, the AMT-Atri particles showed irregular sides and edges with the smooth and bright surface, indicating the weak crystalline structure. Upon calcination, NMoC@Mo exhibited the layered structure stacking on top of each other with sharp edges and corners, demonstrating the strong crystalline nature with a rough surface. This unique structure can provide efficient channels permitting fast and easy intercalation of the electrolyte ions between the layers. In addition, this may bring more active sites on the electrode surface and increase the surface area which is necessary for ion adsorption. TEM images (FIGS. 3B-3C & 3F-3G) verify the SEM findings that uncalcined AMT-Atri has a non-crystalline and plate less structure while calcined NMoC@Mo displayed the stacked layers and crystalline structure as affirmed further by SAED patterns. SAED pattern (FIG. 3D) of uncalcined AMT-Atri showed the blurred and thin rings (characteristics of weakly ordered structure), whereas the calcined NMoC@Mo displayed the discrete spots with high intensity, demonstrating the cubical structure of the plates (FIG. 3H). The high magnification image of TEM helped to measure the distance between two plates on the thin edges of the plates, as shown in FIG. 3G. The adjacent distance between any two layers/plates was estimated around 10 nm.

FIG. 4A illustrates the X-ray diffraction (XRD) diagrams of as-synthesized nanocomposite having multilayer structure of NMoC@Mo. The peaks belong to these patterns are located between 20-80°, corresponding to $Mo_2C$ and $Mo_2N$ phases in monoclinic $MoO_3$ (JCPDS No: 25-1366 and JCPDS No: 05-0508, JCPDS No: 35-0787). [E. Altintig, et. al., Environmental Technology and Innovation, 21 (2021) 101305; S. Pai, et. al., Surfaces and Interfaces. 23 (2021) 100947; M. M. El-Sayed, Carbohydrate Polymer Technologies and Applications, 2 (2021) 100123, each of which is incorporated herein by reference in its entirety]. The peaks located at 2θ of 23.1°, 26°.1, 27.4°, and 38.4° confirm the existence of $MoO_3$ planes (020), (110), (040), (021), and (060), respectively. Likewise, the presence of the planes (002), (101), (102) and (103) can be shown by the corresponding peaks at 2θ of 37.7°, 39.4°, 52.1° and 69.6°. Moreover, the $Mo_2N$ planes (111), (200) and (220) can be detected from the peaks of 37°, 42.4° and 64.4°, respectively [S. M. Goodman, et. al., ACS Appl. Nano Mater., 1 (2018) 5682-5690, incorporated herein by reference in its entirety].

Figure 4B:
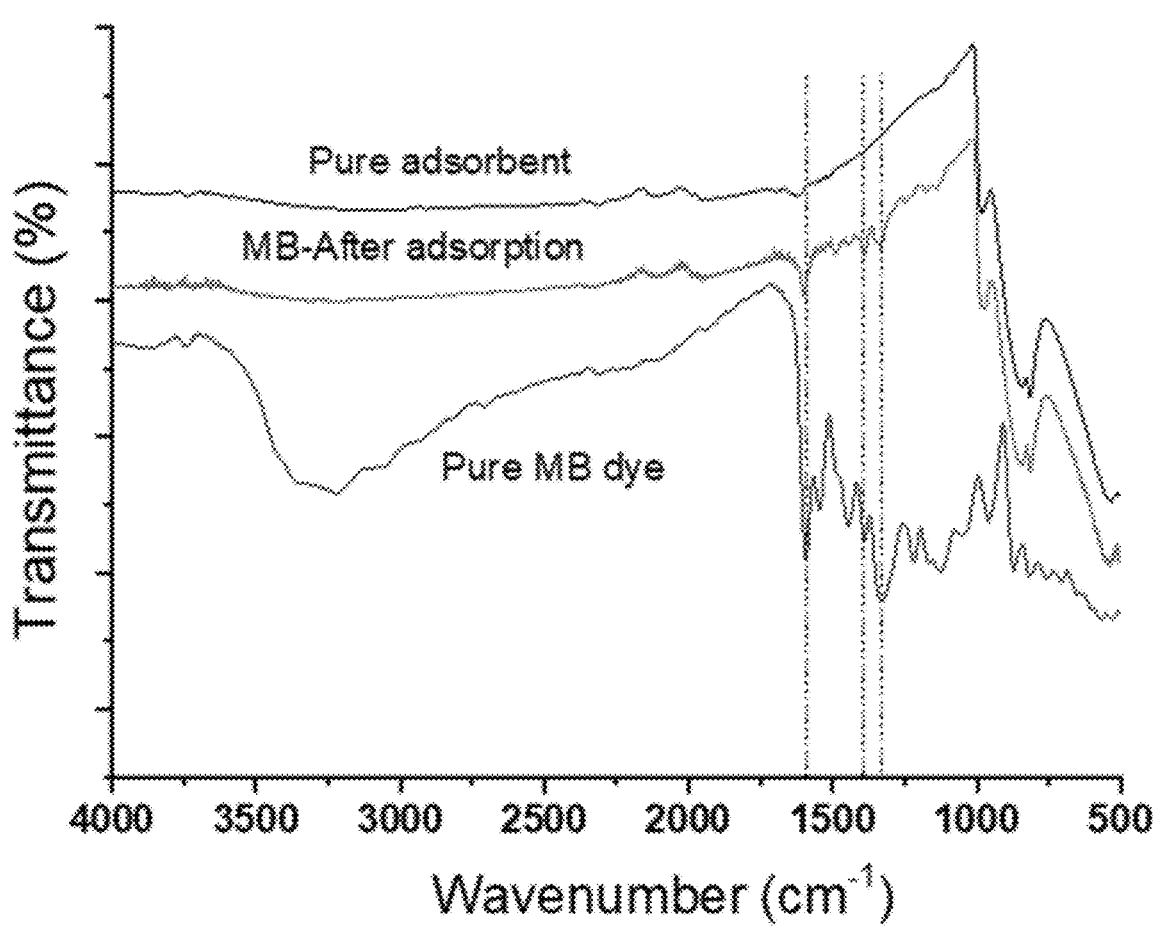
FIG. 4B shows the FTIR analysis of pure adsorbent (before adsorption), MB deposited on adsorbent (after adsorption) and pure MB dye.

FIG. 4B shows the FT-IR spectrum of pure adsorbent (before adsorption), MB deposited on adsorbent (after adsorption) and pure MB dye. Pure MB has vibration bands centered at 3250 $cm^{-1}$ (broad), 2925 $cm^{-1}$ and 2853 $cm^{-1}$, 1632 $cm^{-1}$, 1383 $cm^{-1}$, 1213 $cm^{-1}$ and 955 $cm^{-1}$ corresponding to O—H group, C—H asymmetric stretch, C—C or C—N aromatic ring, —$CH_3$ bending, C—N stretch and C—H bending (aromatic)[C. S. Bhatt, et. al., Journal of Molecular Liquids, 242 (2017) 958-965, incorporated herein by reference]. The calcinated product, NMoC@Mo has the Mo=0 stretching vibration is located at 980 $cm^{-1}$ and the vibrations of Mo—O are observed between 750 and 500 $cm^{-1}$. In addition, the spectrum indicates the layered orthorhombic $MoO_3$ phase at 867 $cm^{-1}$ due to stretching mode of Mo—O—Mo bonds, and a broadening at 550 $cm^{-1}$ for bending vibrations of Mo—O [P. Wongkrua, et. al., Journal of Nanomaterials, 2013 (2013) 1-8, incorporated herein by reference in its entirety]. Clearly, the successful deposition of the dye product onto host material was demonstrated by the peaks designated to MB (FIG. 4B).

Figures 5A, 5B, 5C, 5D, 5E, 5F:
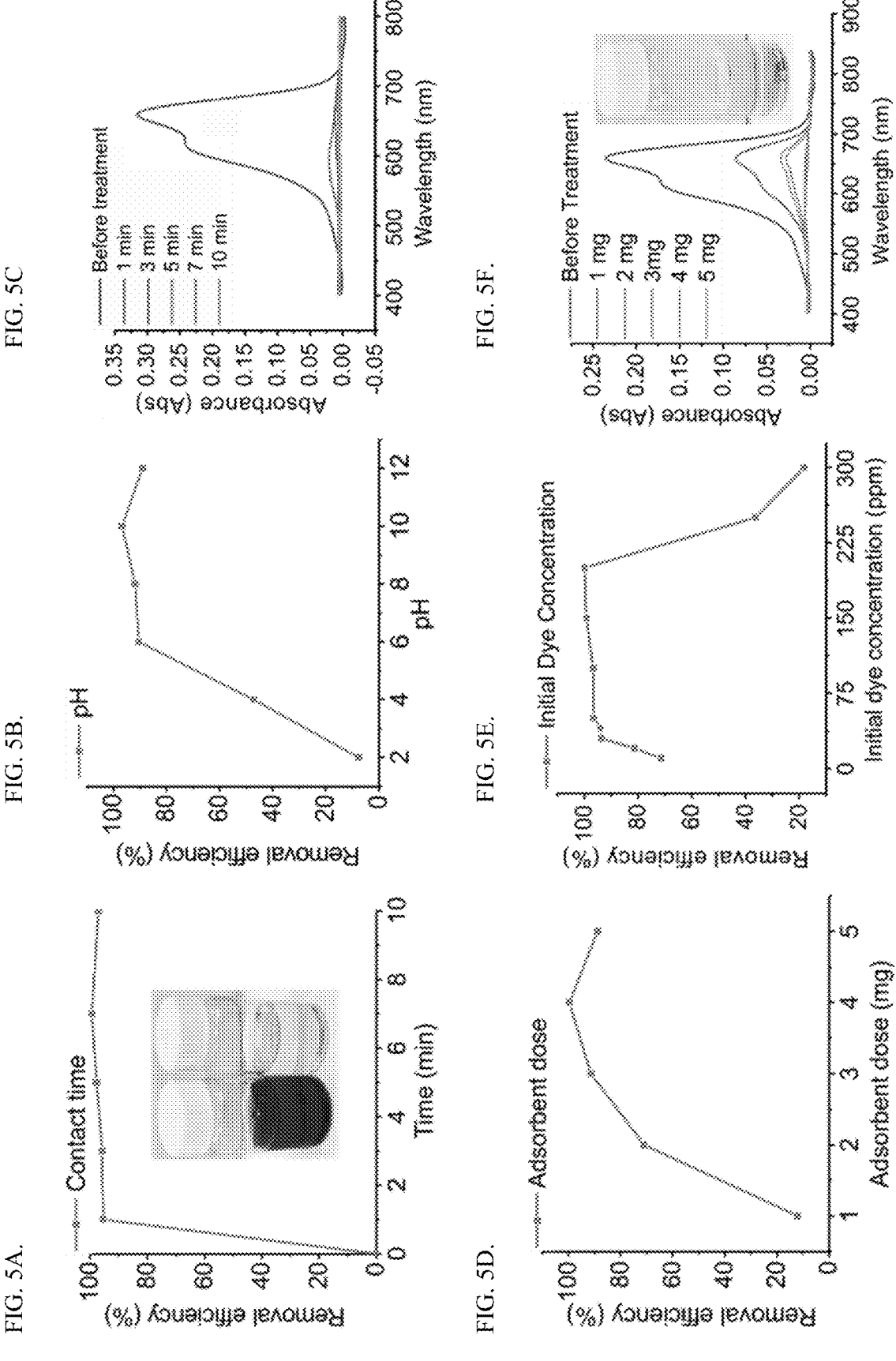
FIGS. 5A-5F are plots of various batch adsorption studies where

The effect of contact time (1 min -10 min) on the percentage dye removal (FIG. 5A) was studied with initial adsorbent dose (2 mg), initial pH (6), and initial dye concentration (100 ppm). At the first stage, it was observed that the MB removal efficiency increased very rapidly in 1 min (95.8%), which could be attributed to the occurrence of a high concentration gradient during the sorption phenomenon and the availability of abundant active sorption sites on the surface of NMoC@Mo nanosheets. After that, MB removal slowed down with a further increase in contact time. This may be due to the gradual filling of active sorption sites, and finally, the equilibrium achieved (99.4% at 7 min), indicating the approximately complete removal of dye molecules. With the additional increase in time, the reduction in scavenging of dye molecules was due to desorption and over-saturation of available active adsorption sites. FIG. 5C displays the changes of UV-vis absorption spectra with different contact time periods (1 min-10 min). MB dye removal was confirmed and examined from the absorbance peak obtained at 665 nm with varying contact time.

FIG. 5B presents the effect of pH on the removal of MB dye molecules by varying the pH between 2 to 12 at optimized contact time (7 min), fixed initial adsorbent dose (0.002 mg) and initial dye concentration (100 ppm). These findings represent that in the acidic range (pH: 2-4), due to the high mobility of protons and their competition with dye molecules for the available active sorption sites, the dye removal process was somehow slow. Subsequently, as the pH further increased to 10, fast removal of dye was observed. This could be due to the electrostatic interaction of dye cationic species with the negatively charged surface of the adsorbent. Hence, maximum MB removal (96.7%) was observed at pH 10. However, after pH 10, the dye removal reduced slightly due to the abundance of hydroxyl ions that started attaching directly to the dye molecules, reducing its adsorption onto active adsorbent sites.

FIG. 5D depicts the percentage removal efficiency of MB dye with varying adsorbent doses (1 mg-5 mg) at optimized contact time ((7 min), pH (10), and fixed initial MB concentration (100 ppm)). The removal efficiency of dye molecules increased with the increase in adsorbent dosage (from 1 mg to 4 mg) due to the availability of abundant active adsorption sites on the surface of nanosheets, which resulted in a high surface area of the adsorbent. Consequently, the dye was removed almost completely (99.7%) with 4 mg adsorbent dose. Above 4 mg, the dye adsorption rate decreased due to the agglomeration of adsorbent particles. This decrease may also be attributed to the reduction in the easy access to active adsorption sites on the adsorbent surface. FIG. 5F shows the UV-vis spectrum of MB adsorption from an aqueous solution with varying adsorbent dosages (1 mg-5 mg). The absorbance dye removal at different adsorbent dosages was examined at 665 nm, indicating that how almost all dye disappeared at 4 mg of adsorbent dose.

The MB concentration effect was investigated by varying concentrations in the range of 10 ppm to 300 ppm, using previously optimized conditions i.e., contact time (7 min), pH (10), and adsorbent dose (4 mg). The results obtained are presented in FIG. 5E, which indicates that the approximately complete dye removal (99.8%) was achieved at 200 ppm. At low initial concentrations (10 mg-30 mg), the dye removal was very rapid due to the availability of a huge number of voids on the surface of the adsorbent. By increasing the MB concentration, the removal efficiency increased sufficiently up to 200 ppm. However, with further increase in initial dye concentrations, removal efficiency slightly decreased due to a maximum coverage of adsorption sites by dye molecules, leaving fewer active adsorption sites.

Figures 6A, 6B, 6C, 6D, 6E, 6F:
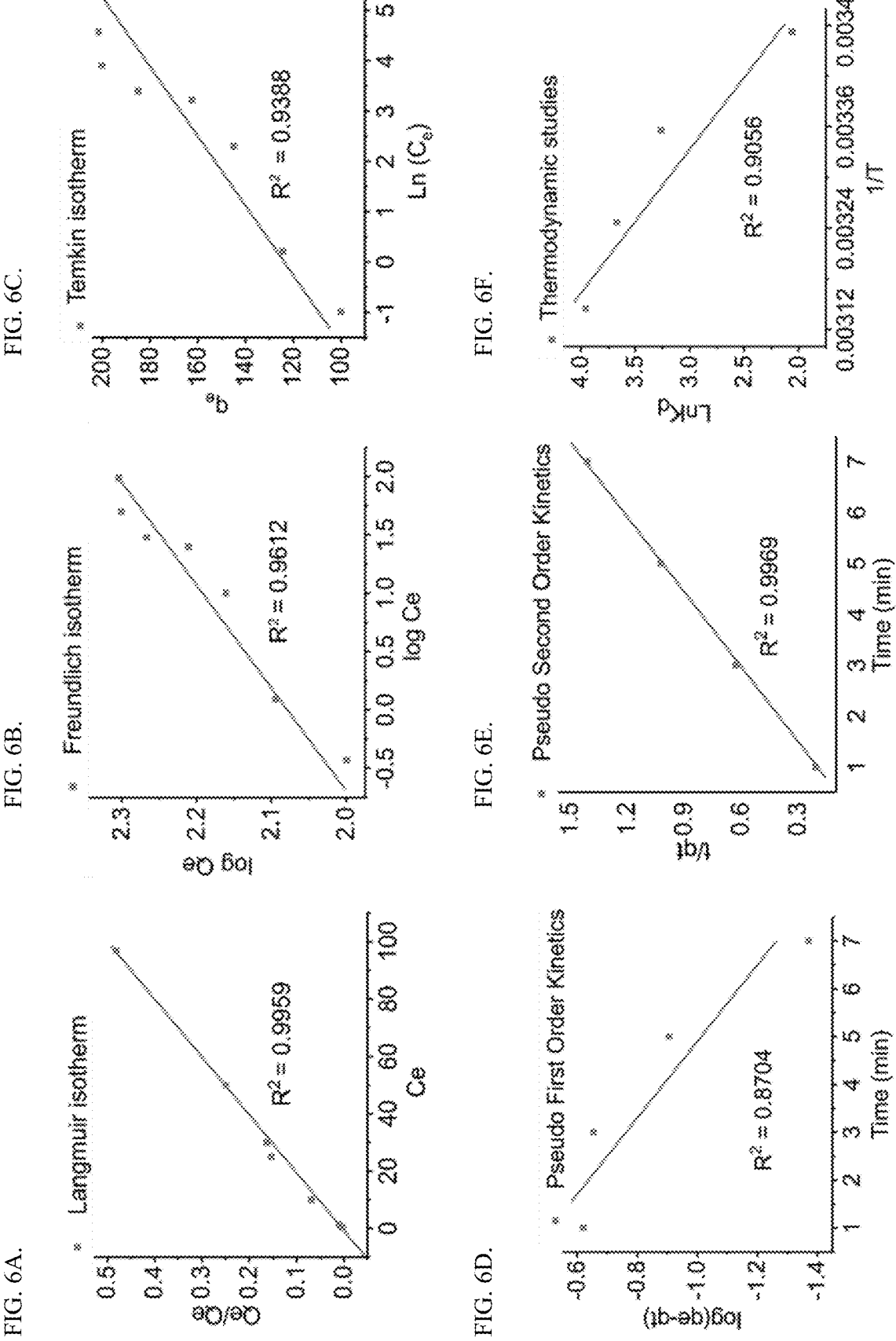
FIGS. 6A-6C are plots of various isotherm models for the adsorption of MB dye onto NMoC@Mo nanosheets where FIG. 6A corresponds to the Langmuir isotherm, FIG. 6B corresponds to the Freundlich isotherm, and FIG. 6C corresponds to the Temkin isotherm.
FIGS. 6D-6F are kinetic plots for MB dye adsorption where

Langmuir, Freundlich, and Temkin isotherm models were studied to determine the adsorption mechanism on the adsorbent surface and understand interactions between adsorbate and adsorbent interactions. FIG. 6A-6C represent the Langmuir, Freundlich, and Temkin isotherm models for the adsorption of MB dye molecules onto NMoC@Mo nanosheets, and all relevant equilibrium parameters calculated from their plots are summarized in Table 1. The credibility of adsorption isotherms can be evaluated by the values obtained from regression coefficient ($R^2$) determined from isotherm plots. The value of regression coefficient obtained for Langmuir, Freundlich, and Temkin isotherms were in the following order: Langmuir (0.9959)>Freundlich (0.9602) and Temkin (0.9388) (given in Table 1). The results confirm that MB adsorption data fitted with the Langmuir model more closely for the current study compared to the Freundlich and Temkin isotherms, reflecting that only one dye molecule occupied only one active site on the adsorbent surface (monolayer sorption phenomenon) and the interactions between adsorbed molecules were found negligible. This also shows that the adsorption process is inclined towards chemisorption. Further, the feasibility of the reaction was evaluated by calculating the separation factor ($R_L$). Favorable adsorption takes place if $0 < R_L < 1$. The value of $R_L$ was found to be 0.005, which lies between 0 and 1, indicating that the uptake of MB dye molecules by multi-layer NMoC@Mo nanocomposite is quite favorable, whereas the maximum adsorption capacity calculated from the slope of the linear plot of the Langmuir model was found out to be 204 mg g$^{-1}$. Additionally, the value of n obtained from Freundlich isotherm was found greater than 1, therefore, representing an excellent adsorption process.

Kinetic studies for the adsorption process were conducted to calculate the contact time required in each experiment of adsorption for the dye solution to establish an equilibrium state. In other words, kinetics helps determine the rate constant for the adsorption process and investigate the nature of the adsorption process in terms of the physical or chemical nature of process. In the current research, two models (pseudo first-order kinetics and pseudo second-order kinetics) were used to evaluate the time dependence of MB adsorption process.

FIGS. 6D-6E illustrate the graphical representation of pseudo-first order and pseudo second-order kinetic plot. The values of different kinetic parameters obtained from model simulations are tabulated in Table 1. Comparison of the values of correlation coefficients ($R^2$) for both models showed that pseudo-second-order kinetic model is more appropriate to describe the adsorption process because it yielded a higher $R^2$ value (0.9997) compared to the other model ($R^2 = 0.8705$). Hence, it indicates that the sorption of MB dye molecules onto NMoC@Mo nanosheets is chemical in nature.

Different thermodynamic variables such as Gibbs free energy ($\Delta G$), enthalpy ($\Delta H$), and entropy ($\Delta S$) are essential in exploring the nature of the adsorption phenomenon. All thermodynamic parameters were calculated from the Van't Hoff plot (ln $K_d$ vs 1/T) (FIG. 6F) and tabulated in Table 1. The negative values of $\Delta G°$ indicate that the adsorption reaction was spontaneous, hence, confirming the feasibility of the process. Moreover, the rise in the absolute value of $\Delta G°$ from −4.933 KJmol$^{-1}$ to −10.463 KJmol$^{-1}$ with temperature indicates that the process of adsorption is favorable at elevated temperatures. The positive sign with $\Delta H°$ values depict that the MB adsorption process is endothermic, which shows that the adsorption process is carried out by dissociation of the adsorbate, which corresponds to the MB degradation in this study. The positive value of $\Delta S°$ specifies that the degree of randomness increased as a result of the dissociation of MB dye molecules.

TABLE 1

Isothermic, kinetic, and thermodynamic adsorption studies of MB dye onto NMoC@Mo nanosheets

| Adsorption models | Parameters | MB |
|---|---|---|
| Isotherm studies Langmuir isotherm | $R^2$ | 0.9959 |
| | b (L/mg) | 0.376 |
| | $K_L$ | 0.025 |
| | $Q_m$ (mg g$^1$) | 204 |
| Freundlich isotherm | $R^2$ | 0.9612 |
| | $K_F$ | 114.81 |
| | n | 7.94 |
| Temkin isotherm | $R^2$ | 0.9388 |
| | $\alpha$ | 1.172 |
| | $\beta$ | 115.97 |

TABLE 1-continued

Isothermic, kinetic, and thermodynamic adsorption studies of MB dye onto NMoC@Mo nanosheets

| Kinetic studies | Pseudo first-order kinetic model | $R^2$ | 0.9388 |
|---|---|---|---|
| | | $k_1$ (1/min) | −0.020 |
| | | $q_e$ (mg g$^{-1}$) | 1.87 |
| | Pseudo second-order kinetic model | $R^2$ | 0.9997 |
| | | $k_2$ (1/min) | 2.20 |
| | | $q_e$ (mg g$^{-1}$) | 5.001 |

| | Temperature (K) | $\Delta G$ (KJmol$^{-1}$) | $\Delta H$ (KJmol$^{-1}$) | $\Delta S$ (Jk$^{-1}$mol$^{-1}$) |
|---|---|---|---|---|
| Thermodynamic studies | 288 | −4.933 | 46.86 | 181.77 |
| | 298 | −8.087 | | |
| | 308 | −9.397 | | |
| | 318 | ~10.463 | | |

Results of pure water flux (L/m$^2$-h) and percentage (%) removal of MB dye of pure PVDF and nanocomposite membranes along with their respective contact angles and flux recovery ratios (FRR) are given in Table 2.

Figures 7E, 7F:
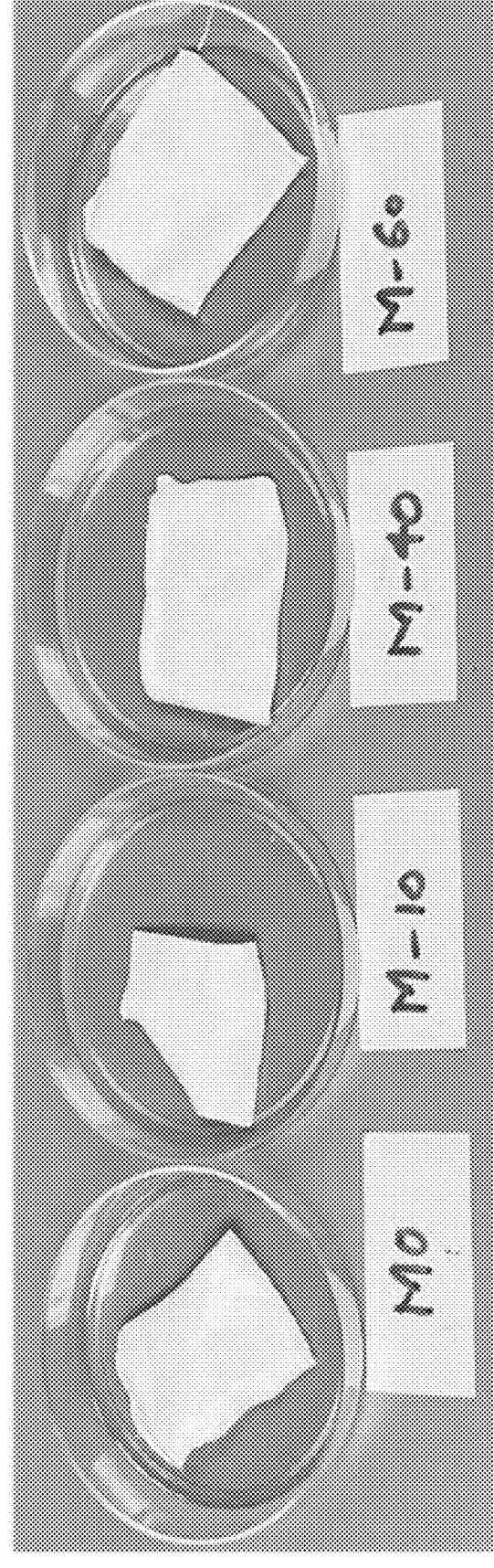
FIG. 7E is a photographic view of pure PVDF and nanocomposite membranes with different concentrations.
FIG. 7F shows the measurement of contact angles of NMoC@Mo nanosheets modified PVDF membranes.

FIG. 7A illustrates the graph of pure water flux and water contact angle (to assess the hydrophilic/hydrophobic characteristics) of pure PVDF (M0) and all nanocomposite membranes (M-10, M-40, and M-60). With the addition of NMoC@Mo loadings (10 mg and 40 mg) in membranes (M-10, and M-40), the values of pure water flux changed from 26.67 L/m$^2$-h to 53.35 L/m$^2$-h and contact angle from 96.58° to 79.94°, respectively. The decline in WCA with the increased concentration of nanosheets attributes to the migration of nanostructures in the membrane during the membrane synthesis process. Moreover, the addition of hydrophilic loadings to the membrane possibly reduced the interaction between polymer chains, resulting in porous structure and improved membranes' hydrophilicity, leading to the significant increase (approx. 50%) in water flux enhancement with M-40 at atmospheric pressure. Thus, gravity-driven filtration was performed under atmospheric pressure without the assistance of complex pressure equipment (see supplementary video). On the contrary, with the further increase in the quantity of NMoC@Mo (60 mg) in the membrane (M-60), the WCA (89.12°) increased along with a certain decline in water flux (46.24 L/m$^2$-h). This could be due to the formation of some agglomerates of nanostructures inside the membrane, which can increase the surface roughness, thus causing hydrophobization of the membrane. FIG. 7B displays the pure water flux (PWF), and dye permeate flux of a feed solution (100 ppm MB dye), through pure and modified nanocomposite membranes. It is clear from the figure that the addition of NMoC@Mo nanosheets to the membranes has significantly improved the flux rate and thus, reduced the flux difference between PWF and permeate flux of aqueous solution containing MB dye for all membranes, indicating a decline in membrane fouling. Aiming at to determine membrane separation properties of nanocomposite membranes, two aqueous solutions containing 100 ppm and 200 ppm of MB dye were prepared and used as feed. FIG. 7C shows the percentage (%) dye rejection of pure and nanocomposite membranes. It can be observed from the figure that the percentage of dye rejection increased as the amount of NMoC@Mo increased in the nanocomposite membranes. For the feed containing 100 ppm of MB dye solution, the percentage (%) dye rejection increased from 75.2% in M0 to approximately 85% in the membrane (M-40). Increasing the concentration of NMoC@Mo provides a more porous structure to the nanocomposite membranes, thus enhancing membrane adsorption sites that could be more accessible for MB adsorption. However, with a further increase in NMoC@Mo, the % rejection efficiency of dye decreased, which might be associated with the agglomeration of nanostructures inside the membrane matrix. It is also evident from the figure that dye rejection efficiency was reduced with increasing concentration (200 ppm) of MB dye solution. This effect could be explained by dye mass transfer driving force, which means that when MB concentration was increased in the feed solution, it resulted in enhancement of driving force to pass through the membrane; however, its separation efficiency got reduced. FIG. 7D displays a pictorial view of pure PVDF membrane and synthesized nanocomposite membranes (M0, M-10, M-40, and M-60) along with their contact angles, 96.58°, 83.18°, 79.94°, and 89.12°, respectively (FIG. 7F). Results exhibit the MB dye retained on the M-40 nanocomposite membrane after filtration of aqueous dye solution (FIG. 7E).

TABLE 2

Pure water flux, dye removal efficiency, flux recovery ratios, and contact angles of pure PVDF and nanocomposite membrane.

| Membrane | Pure water flux (L/m²-h) | Dye removal efficiency (%) | Flux recovery ratio (%) (After first cycle) | Flux recovery ratio (%) (After second cycle) | Contact angle |
|---|---|---|---|---|---|
| M0 | 26.7 | 75.3 | 71 | 61.8 | 96.58° |
| M-10 | 43.4 | 78.7 | 77.7 | 71 | 83.18° |
| M-40 | 53.4 | 84.8 | 95.6 | 90.9 | 79.94° |
| M-60 | 46.2 | 53.6 | 75 | 64 | 89.12° |

Figures 8A, 8B, 8C, 8D, 8E, 8F:
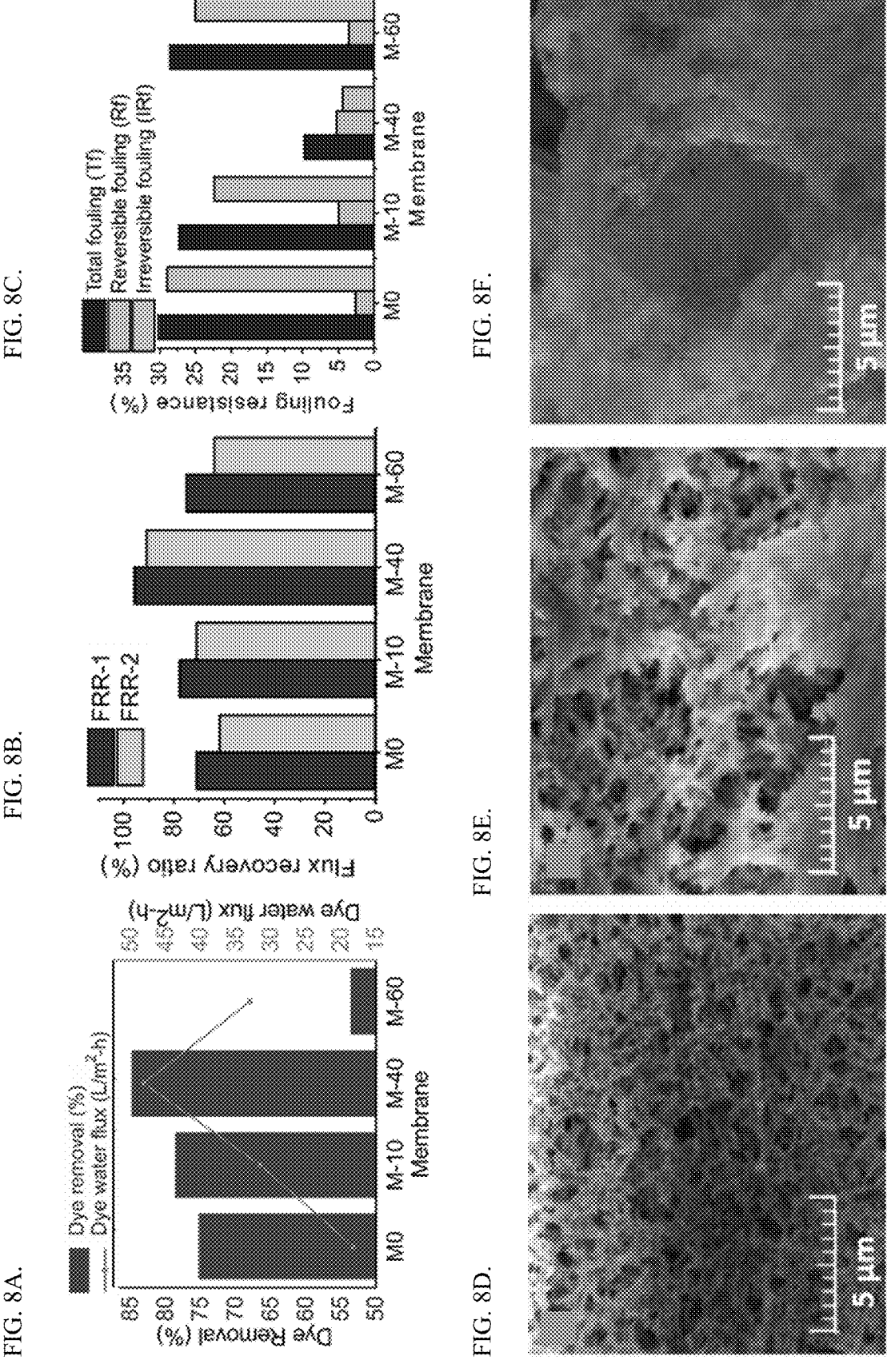
FIG. 8A is a plot of percentage (%) dye removal and dye water flux for pure PVDF and nanocomposite membranes.
FIG. 8B is a plot of the flux recovery ratio for pure PVDF and nanocomposite membranes.
FIG. 8C is a plot of percentage (%) fouling resistance of pure PVDF and nanocomposite membranes.
FIGS. 8D-8F show SEM images of M0 before MB filtration (FIG. 8D), M-40 before MB filtration (FIG. 8E), and M-40 after MB filtration (FIG. 8F).
Figures 8G, 8H, 8I, 8J:
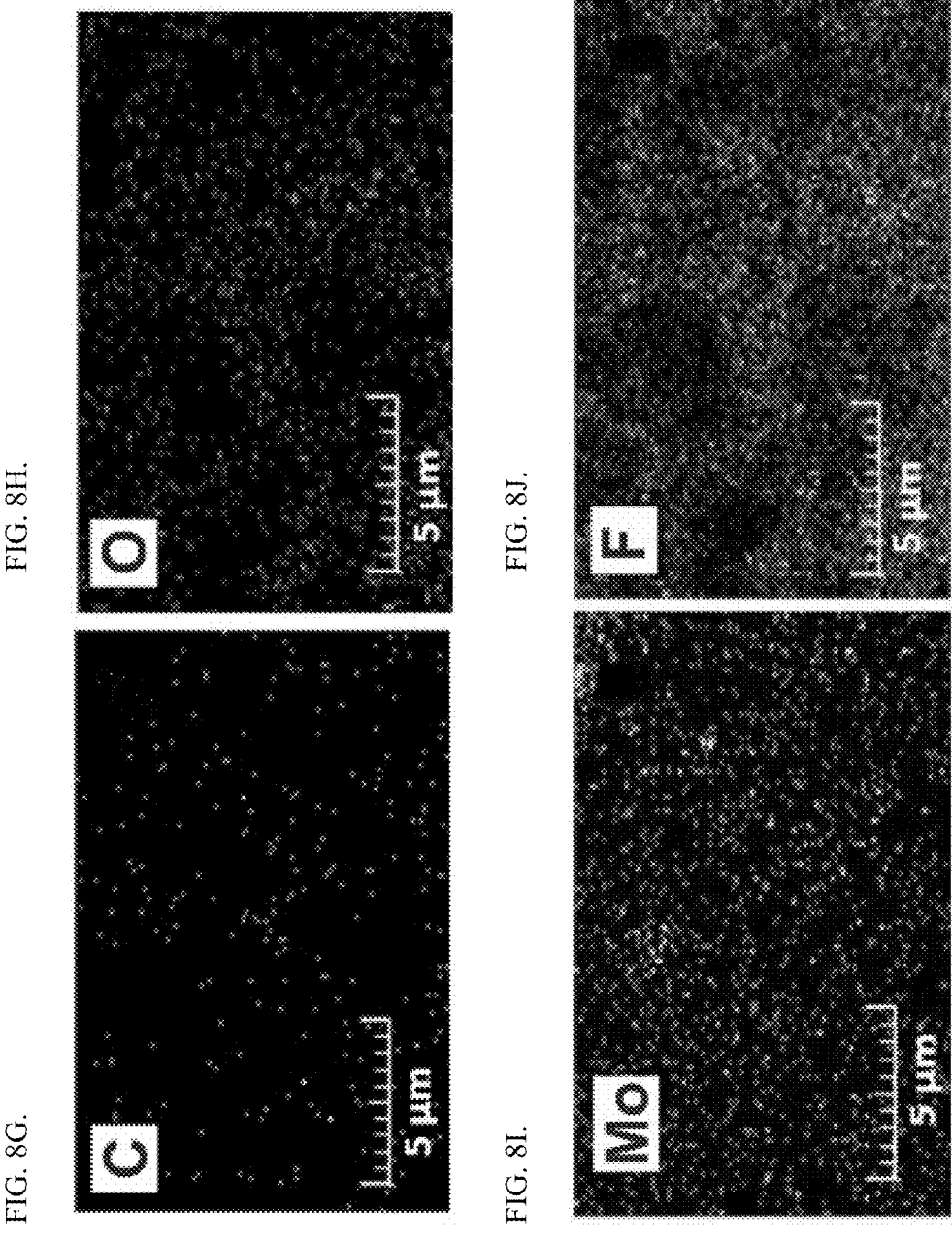
FIGS. 8G-8J show EDX mapping of M-40 nanocomposite membranes before MB filtration process where

FIG. 8A shows that with 100 ppm MB dye solution in feed, M-40 nanocomposite membrane owing to its highly hydrophilic nature (lowest contact angle, 79.94°), exhibits the highest percentage of dye removal (approx. 85%) along with a maximum dye permeate flux of 48.1 L/m²-h, among other membranes. During membrane filtration, membrane fouling occurs, which affects membrane operation in various ways, such as degradation of the membrane surface, declining flux rates, and huge maintenance costs. Although membrane fouling is regarded as an inevitable problem, it can be overcome by adding some hydrophilic substances into the membrane matrix. In the current research, NMoC@Mo nanosheets were introduced into the casting solutions of membranes. Resultantly, the hydrophilic behavior of membranes got increased, which led to reduced membrane fouling.

Figure 9:
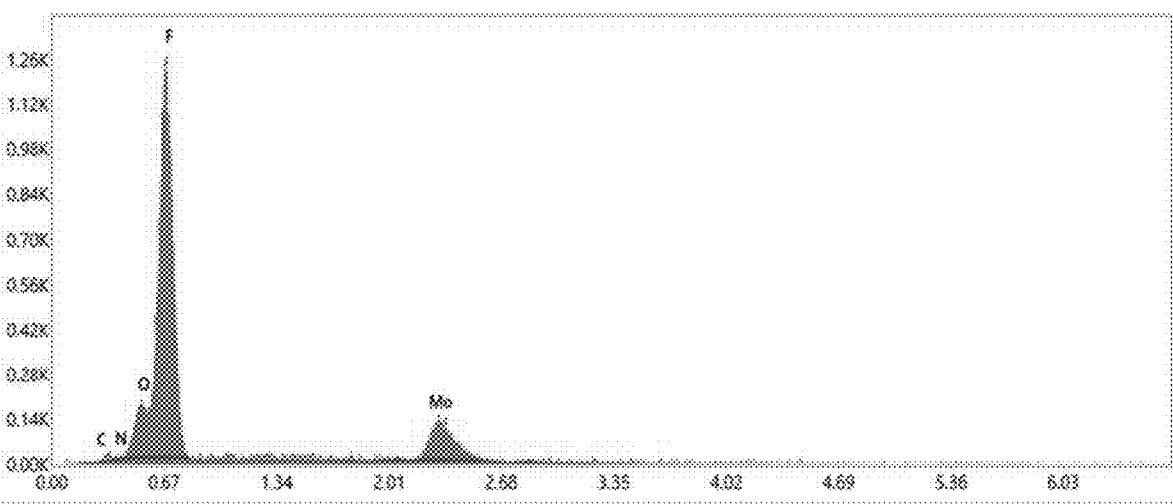
FIG. 9 is an EDX spectrum of M-40 nanocomposite membranes before MB dye filtration.
Figure 10:
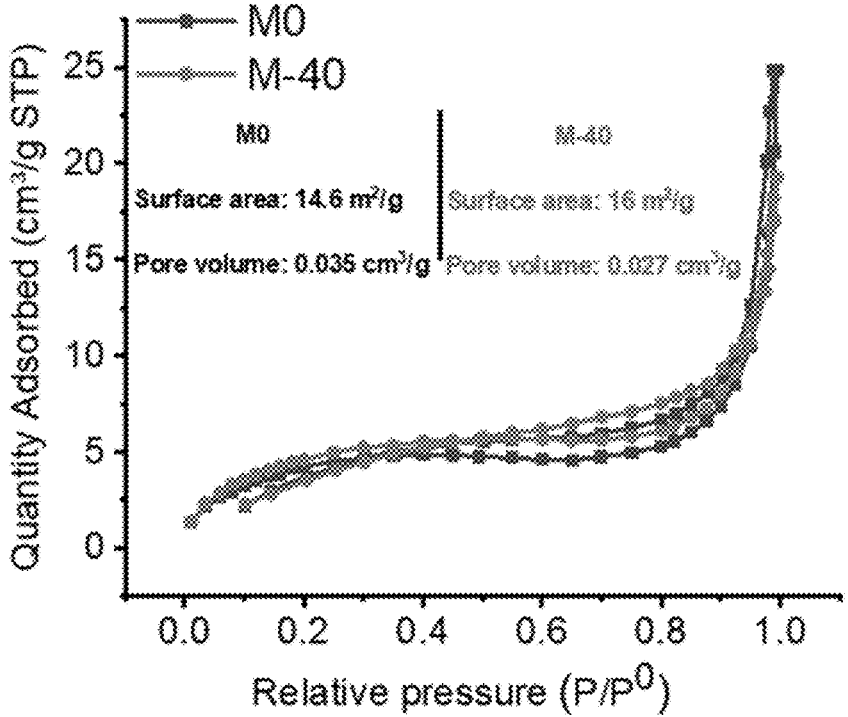
FIG. 10 is a plot of BET analysis of Pure PVDF (M0) and nanocomposite (M-40) membrane.

FIG. 8B displays the graphical presentation of flux recovery ratio (FRR), which is considered as a crucial fouling factor, and the values of FRR are tabulated in Table-1. It can be observed that FRR increased from 88.6% for M0 to 92.8% for M-40, thus demonstrating that the antifouling ability of membrane increased due to incorporation of NMoC@Mo in membrane matrix. Moreover, M-40 nanocomposite membrane, due to higher surface hydrophilicity, captured water molecules on its surface, leading to the formation of a thin water layer that might work as a barrier against the deposition of MB dye molecules on its surface. A maximum of 95.6% recovery was obtained with M-40, after two cycles. In addition, a decline in FRR was also observed at a high concentration of NMoC@Mo nanosheets in the membrane (M-60), which could be a result of possible clumps formation of nanostructures at high content ratios, thus causing reduced repulsion between dye molecules and membrane surface. FIG. 8C demonstrates the membrane fouling factors, including total fouling (TF), reversible fouling (RF), and irreversible fouling (IRF) resistance, in order to understand the fouling process in more detail. It is clear from the figure that TF and IRF in M0 and M-40 decreased from 31.97% and 9.72% to 28.96% and 4.41%, respectively. In addition, the RF increased from 2.61% in M0 to 5.31% in M-40, indicating that the effect of concentration polarization produced on the surface of the membrane can be removed easily in the case of M-40, compared to the M0. FIG. 8D exhibits SEM analysis of pure PVDF membrane before filtration process, representing the porous morphology of membrane. FIG. 8E shows the SEM image of the membrane containing 40 mg of NMoC@Mo nanosheets (M-40). It can be observed that the membrane surface porosity has significantly enhanced, which reflects that the incorporation of nanosheets improved hydrophilic behavior and pure water flux of the membrane. FIG. 8F exhibits SEM image of the membrane (M-40) obtained after MB filtration process. The SEM images show all the abundant pores present on the surface of the nanocomposite membrane, available for MB binding molecules, have been nearly occupied, indicating the dye entrapment inside the membrane. The homogeneous dispersion of NMoC@Mo into the M-40 PVDF membrane matrix (before dye filtration) was studied by EDX mapping (FIG. 8G-8J). FIG. 9 also presents the EDX spectrum of M-40 nanocomposite membranes before MB filtration process. The EDX mapping of the sample confirms the homogeneous presence of all essential elements, including carbon (C), oxygen (O), molybdenum (Mo), and fluoride (F). FIG. 10 shows the BET analysis of Pure PVDF (M0) and nanocomposite (M-40) membrane, depicting the increase in surface area of membrane (M-40) after the incorporation of NMoC@Mo nanosheets into the PVDF matrix.

Figure 11:
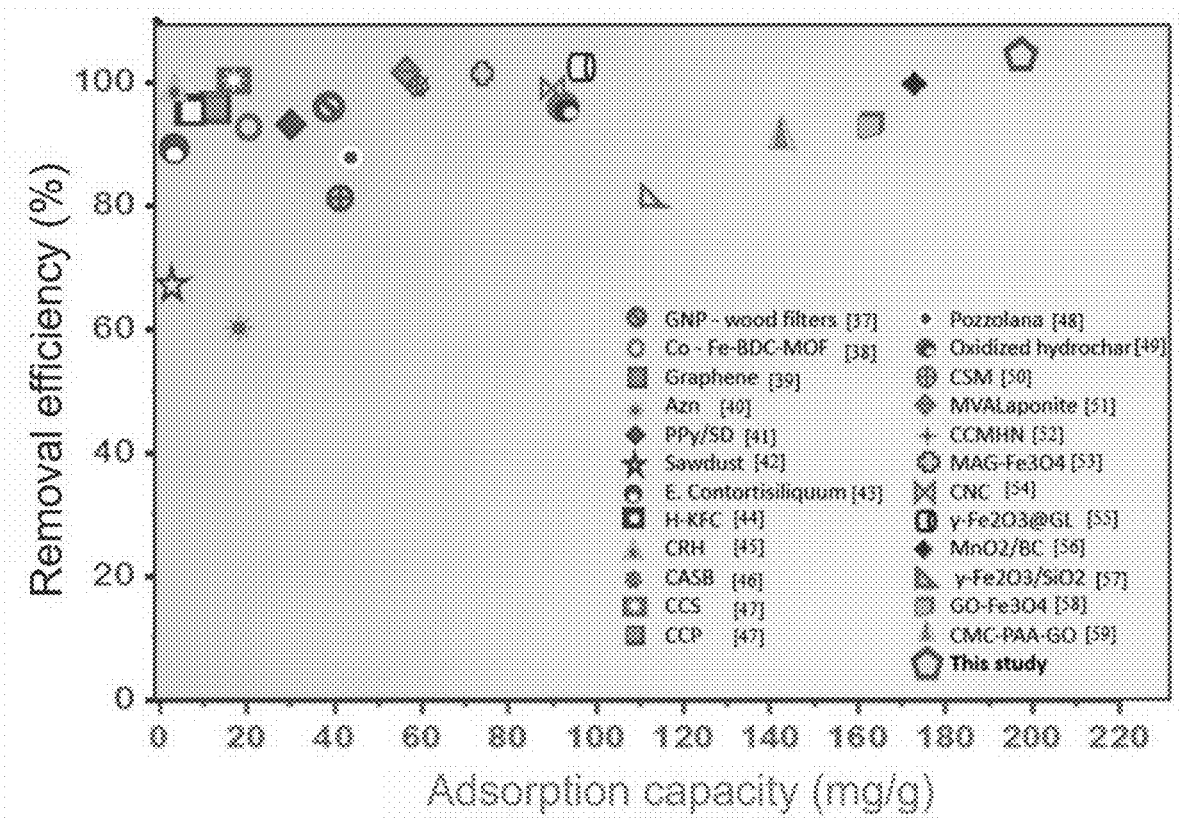
FIG. 11 is a comparison of performance of removal efficiencies and adsorption capacities of previously reported adsorbents with the membranes of the present disclosure.
Figure 12:
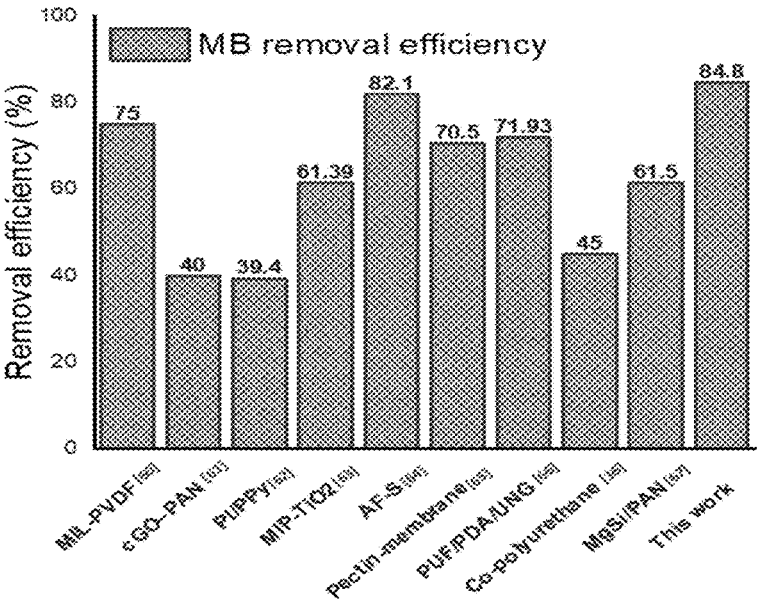
FIG. 12 is a bar graph showing a comparison of MB dye removal efficiency based on various membrane-based filtration processes.

FIG. 11 summarizes the comparative links between NMoC@Mo nanosheets and other sorbents in terms of their adsorption capacities and removal efficiencies for MB dye achieved through batch adsorption studies. The adsorption capacity, as well as removal efficiency of the understudied adsorbent for the MB dye, was found significantly higher than that of other reported adsorbents, demonstrating that it could be classified as a potential adsorbent for the MB dye removal from aqueous solution. FIG. 12 reveals the comparison of MB dye removal efficiency obtained in this study, using nanocomposite membrane-based filtration process, with the reported literature values. Maximum MB removal achieved in the current study was 84.8%, which is comparatively higher than removal efficiencies achieved by using several other types of membranes.

The invention claimed is:

1. A nanocomposite sorbent, comprising:
molybdenum carbide,
molybdenum nitride, and
molybdenum oxide present in an amount of greater than 50 wt % based on a total weight of the nanocomposite sorbent, wherein
the nanocomposite sorbent is in the form of nanosheets having a mean size of 10 to 100 µm and a mean thickness of 10 to 1000 nm, and
the molybdenum carbide, molybdenum nitride, and molybdenum oxide are each crystalline as measured by PXRD.

2. The nanocomposite sorbent of claim 1, wherein the nanosheets exist as stacks having a mean distance between nanosheets of 2 to 20 nm.

3. The nanocomposite sorbent of claim 1, wherein: the molybdenum oxide is monoclinic $MoO_3$;

the molybdenum carbide is ß-$Mo_2C$ and is present in an amount of at least 10 wt % based on a total weight of the nanocomposite sorbent; and the molybdenum nitride is γ-$Mo_2N$ and is present in an amount of at least 10 wt % based on a total weight of the nanocomposite sorbent.

4. A membrane filter, comprising a polymer and the nanocomposite sorbent of claim 1.

5. The membrane filter of claim 4, wherein the polymer is at least one selected from the group consisting of cellulose acetate, polyamide, polyvinylidene fluoride, polytetrafluoroethylene, poly (tetrafluoroethylene-co-hexafluoropropylene), poly (tetrafluoroethylene-co-perfluoro (alkylvinyl ether)), poly (ethylene-co-tetrafluoroethylene), poly (chlorotrifluoroethylene), poly (chlorotrifluoroethylene-co-ethylene), polyvinylfluoride, polysulfone, polyethersulfone, polyvinyl chloride, polyimide, polyacrylonitrile, polyethylene glycol, polyvinyl alcohol, poly (methacrylic acid), poly (arylene ether ketone), poly (ether imide), polyaniline, and polyethersulfone amide.

6. The membrane filter of claim 4, wherein the polymer is a fluorine-containing polymer selected from the group consisting of polyvinylidene fluoride, polytetrafluoroethylene, poly (tetrafluoroethylene-co-hexafluoropropylene), poly (tetrafluoroethylene-co-perfluoro (alkylvinyl ether)), poly (ethylene-co-tetrafluoroethylene), poly (chlorotrifluoroethylene), poly (chlorotrifluoroethylene-co-ethylene), and polyvinylfluoride.

7. The membrane filter of claim 4, wherein the nanocomposite sorbent is present in the membrane filter in an amount of 0.25 to 10 wt %, based on a total weight of membrane filter.

8. The membrane filter of claim 4, having a water contact angle of 96° to 75°.

9. The membrane filter of claim 4, having a thickness of 100 to 200 μm and a pure water flux of 27.5 to 75 $L/m^2$-h.

10. The membrane filter of claim 4, having a surface area of greater than 14.6 to 20 $m^2$/g and a pore volume of 0.010 to less than 0.035 $cm^3$/g.

11. The nanocomposite sorbent of claim 1, further comprising an adsorbed organic pollutant which is at least one selected from the group consisting of a dye, a phenol, a polycyclic aromatic hydrocarbon, an herbicide, a pesticide, and a persistent organic pollutant.

12. The nanocomposite sorbent of claim 11, wherein the organic pollutant is methylene blue.

13. The nanocomposite sorbent of claim 11, wherein the adsorbed organic pollutant is present on an outer surface of the nanocomposite sorbent and between adjacent nanosheets of the nanocomposite sorbent.

14. The nanocomposite sorbent of claim 11, wherein the adsorbed organic pollutant is present in an amount of 0.005 to 0.075 mg organic pollutant per mg of nanocomposite sorbent.

15. The nanocomposite sorbent of claim 2, wherein the nanosheets are arranged to form channels between adjacent nanosheets.

\* \* \* \* \*